(12) United States Patent
Kato et al.

(10) Patent No.: US 8,194,694 B2
(45) Date of Patent: Jun. 5, 2012

(54) MOBILE COMMUNICATIONS SYSTEM, BASE STATION APPARATUS, MOBILE STATION APPARATUS AND MOBILE COMMUNICATIONS METHOD

(75) Inventors: Yasuyuki Kato, Osaka (JP); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 71 days.

(21) Appl. No.: 12/682,711

(22) PCT Filed: Oct. 16, 2008

(86) PCT No.: PCT/JP2008/068757
§ 371 (c)(1),
(2), (4) Date: Apr. 12, 2010

(87) PCT Pub. No.: WO2009/054311
PCT Pub. Date: Apr. 30, 2009

(65) Prior Publication Data
US 2010/0216479 A1    Aug. 26, 2010

(30) Foreign Application Priority Data

Oct. 24, 2007 (JP) ................ 2007-276252

(51) Int. Cl.
*H04B 7/212* (2006.01)
*H04W 4/00* (2009.01)
*H04W 72/00* (2009.01)
(52) U.S. Cl. ............ 370/442; 370/331; 455/450
(58) Field of Classification Search ........... 370/328, 370/329, 330, 461, 462, 335, 342, 337, 347, 370/348, 349; 455/452.1, 515, 431
See application file for complete search history.

(56) References Cited

U.S. PATENT DOCUMENTS 6,708,037 B1 * 3/2004 Moulsley et al. ........ 455/452.1
(Continued)

FOREIGN PATENT DOCUMENTS

JP      2007-124493 A    5/2007
(Continued)

OTHER PUBLICATIONS

3GPP TS 36.212 V1.2.0 (May 2007), "3rd Generation Partnership Project; Technical Specification Group Radio Access Network; Multiplexing and channel coding," (Release 8), pp. 1-7.

(Continued)

*Primary Examiner* — Hanh Nguyen
(74) *Attorney, Agent, or Firm* — Birch, Stewart, Kolasch & Birch, LLP

(57) ABSTRACT

When the base station apparatus determines that it is necessary to make the mobile station apparatus execute random access, it is determined whether there is an unused signature. Then, the validity period during which the mobile station apparatus can use a signature is determined and the end time of the validity period is calculated. The signature and the calculated end time are included into a random access preamble allocation message, which is transmitted to the mobile station apparatus. The mobile station apparatus extracts the signature and the end time from the random access preamble allocation message, and determines random access channels through which a random access preamble including the signature can be transmitted, based on the extracted end time. As a result, it is possible to provide a base station apparatus and the like which, even if the signature belongs to the validity period, can achieve efficient communication between the base station apparatus and the mobile station apparatus by assigning the signature to another mobile station apparatus.

8 Claims, 19 Drawing Sheets

U.S. PATENT DOCUMENTS

| | | | | |
|---|---|---|---|---|
| 6,907,015 | B1* | 6/2005 | Moulsley et al. | 370/329 |
| 7,809,373 | B2* | 10/2010 | Park et al. | 455/436 |
| 2007/0293224 | A1* | 12/2007 | Wang et al. | 455/436 |
| 2009/0116424 | A1 | 5/2009 | Abeta et al. | |
| 2010/0061298 | A1* | 3/2010 | Kato et al. | 370/328 |

FOREIGN PATENT DOCUMENTS

| | | |
|---|---|---|
| WO | WO 03/100988 A2 | 12/2003 |
| WO | WO 2007/052746 A1 | 5/2007 |

OTHER PUBLICATIONS

3GPP TS 36.300 V8.1.0 (Jun. 2007), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 1-30.

3GPP TSG RAN WG1 #50, R1073436, "Random Access Slot Configurations," Athens, Greece, Aug. 20-24, 2007, pp. 1-3.

3GPP TSG RAN WG2 #57, "Random Access Preamble signatures usage," Feb. 12-16, St. Louis, USA, R2-070524, 4 pages.

3GPP TSG-RAN WG2 Meeting #59, "eNB/ue behaviour regarding handling of dedicated signature," Athens, Greece, Aug. 20-27, 2007, R2-073097, 3 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description . . . ," 3GPP TS 36.300, V8.1.0, Jun. 2007, pp. 1-106, XP-0050377576.

Ericsson, "Initial, Random Access and Identity Handling," TSG-RAN WG2 Meeting #51, Tdoc R2-060592, Denver, USA, Feb. 13-17, 2006, pp. 1-7, XP-0050130549.

Motorola, "Contention and Contention-free Intra-LTE Handovers," 3GPP TSG-RAN WG2 #56bis, R2-070214, Sorrento, Italy, Jan. 15-19, 2007, pp. 1-3, XP-0050133315.

European Search Report issued in European Patent Application No. 08841392.7 on Sep. 16, 2011.

Nokia: "Non contention based HO", 3GPP TSG-RAN WG2 Meeting #57, St. Louis, USA, vol. R2-070455, No. 57, Feb. 12-16, 2007, pp. 1-6, XP002495112.

ZTE: "Non-contention based handover Procedure on RACH Channel", 3GPP Draft; R2-063538, 3rd Generation Partnership Project (3GPP), Mobile Competence Centre; 650, Route Des Lucioles; F-06921 Sophia-Antipolis Cedex; France, vol. RAN WG2, No. Riga, Latvia; Nov. 6-10, 2006,XP050132969.

* cited by examiner

FIG. 3

| Signature No. \ RACH No. in Frame | 1 (0-Subframe) | 2 (5-Subframe) |
|---|---|---|
| 1 | A | B |
| 2 | – | C |
| 3 | D | – |
| 4 | E | F |
| 5 | G | H |
| 6 | – | – |
| 7 | I | J |
| 8 | K | – |

MOBILE COMMUNICATIONS SYSTEM, BASE STATION APPARATUS, MOBILE STATION APPARATUS AND MOBILE COMMUNICATIONS METHOD

TECHNICAL FIELD

The present invention relates to a base station apparatus that establishes uplink synchronization with a mobile station apparatus transmitting a random access preamble including a signature to a random access channel, a mobile station apparatus that establishes uplink synchronization with a base station apparatus using a random access channel, and a mobile communications system including a base station apparatus that establishes uplink synchronization with a mobile station apparatus transmitting a random access preamble including a signature to a random access channel.

BACKGROUND ART

In 3GPP (3rd Generation Partnership Project), the W-CDMA system has been standardized as the third-generation cellular mobile communication system, and the services have been started successively. ESDPA with the communication speed further increased has been also standardized, and the service has been started.

On the other hand, in 3GPP, the evolution of third-generation radio accessing (Evolved Universal Terrestrial Radio Access: represented hereinbelow as "SUTRA") has been studied.

As the downlink of EUTRA, OFDM (Orthogonal Frequency Division Multiplexing) system has been proposed. As the uplink of EUTRA, single-carrier communications scheme of DFT (Discrete Fourier Transform)-spread OFDM system has been proposed.

FIG. 14 shows the outline of the downlink and uplink in EUTRA. Mobile station apparatuses (MS) are connected to a base station apparatus (BS).

The downlink for EUTRA is configured of a downlink pilot channel DPiCH (Downlink Pilot Channel), a downlink synchronization channel DSCH (Downlink Synchronization Channel), a downlink shared channel PDSCH (Physical Downlink Shared Channel), a downlink control channel PDCCH (Physical Downlink Control Channel) and a common control channel CCPCH (Common Control Physical Channel).

The uplink for EUTRA is configured of an uplink pilot channel UPiCH (Uplink Pilot Channel), a random access channel RACH (Random Access Channel), an uplink shared channel PUSCH (Physical Uplink Shared Channel) and an uplink control channel PUCCH (Physical Uplink Control Channel) (see non-patented documents 1 and 2, for example).

Here, the random access channel (RACH) for the uplink of EUTRA uses a bandwidth of 1.25 MHz, and a plurality of access channels are provided so as to deal with accesses from a large number of mobile station apparatuses. FIG. 15 shows one example of the random access channel (RACH).

In FIG. 15, the horizontal axis represents time and the vertical axis represents frequency. FIG. 15 shows the configuration of one radio frame. This radio frame is split into a plurality of radio resources. In this example, the radio resources are constructed of units each of which has a domain having 1.25 MHz in frequency direction and 1 ms in time direction. Random access channels (RACH) and uplink shared channels PUSCH described in FIG. 15 are allotted to these regions as shown in the drawing.

In this way, the minimum unit of the random access channel (RACH) uses a bandwidth of 1.25 MHz. Here, in FIG. 15, the uplink pilot channels UPiCH are distributed in symbol units or in sub-carrier units within the uplink shared channel PUSCH region. Further, since in EUTRA a plurality of channels are prepared for the random access channel (RACH), it is possible to deal with a plurality of random accesses at the same time.

Here, the minimum unit of the random access channel (RACH) uses a bandwidth of 1.25 MHz, and one random access channel (RACH) is prepared in one sub frame on the frequency axis and a plurality of random access channels (RACH) are prepared in one frame depending on the frequency bandwidth of the base station apparatus, whereby it is possible to deal with access from many mobile station apparatuses (see non-patented documents 3 and 4, for example).

Now, FIG. 16 shows a configurational example of random access channels depending on the bandwidth in the base station apparatuses. FIG. 16 is a diagram in which the horizontal axis represents time and sub-frame numbers 0 to 9 are assigned in each frame.

Here, when the bandwidth in the base station apparatus is 1.25 MHz, one random access channel (RACH) is assigned to every two frames (FIG. 16(*a*)). Similarly, when the bandwidth in the base station apparatus is 5 MHz, one channel is assigned to every frame (FIG. 16(*b*)). When the bandwidth in the base station apparatus is 10 MHz, two channels are assigned to every frame (FIG. 16(*c*)). When the bandwidth in the base station apparatus is 15 MHz, three channels are assigned to every frame (FIG. 16(*d*)). When the bandwidth in the base station apparatus is 20 MHz, five channels are assigned to every frame (FIG. 16(*e*)).

The purpose for using the random access channel (RACH) is mainly to establish synchronization in the uplink between the mobile station apparatus and the base station apparatus, and also expected to transmit a few bits of information such as for a scheduling request for allocating radio resources to shorten connection time.

Here, in random access, there is two accessing methods, Contention based Random Access and Non-contention based Random Access. The Contention based Random Access is a random access that may cause collision between mobile station apparatuses, and is a normal random access. On the other hand, the Non-contention based Random Access is a random access that will never cause collision between mobile station apparatuses, and is a random access used for fast synchronization between a mobile station apparatus and a base station apparatus and is executed for a special case such as handover etc. under the initiative of the base station apparatus.

In the case of random access, only the preamble is transmitted for synchronizing. The preamble includes a signature which is a signal pattern representing information. Some tens of kinds of signatures are prepared so as to be able to express some bits of information. At present, it is presumed that 6 bit information is transmitted, hence it is presumed that 64 kinds of signatures are prepared.

It is presumed that of 6 bits of information, 5 bits are assigned to the random ID and the remaining one bit is assigned to the downlink pathloss/CQI (Channel Quality Indicator) or the like.

Here, the communication procedures of the Contention based Random Access and the Non-Contention based Random Access will be roughly described.

To being with, FIG. 17 shows the sequence example of the Contention based Random Access.

First, the mobile station apparatus selects a signature based on the random ID, the downlink path loss/CQI information or the like and transmits a random access preamble through the random access channel (RACH) (message 1).

When receiving the preamble from the mobile station apparatus, the base station apparatus calculates the gap of in timing of synchronization between the mobile station apparatus and the base station apparatus from the preamble, performs scheduling for transmitting a L2/L3(Layer2/Layer3) message, assigns a Temporary C-RNTI (Cell-Radio Network Temporary Identity), sets a RA-RNTI (Random Access-Radio Network Temporary Identity) that represents a response to the mobile station apparatus that transmitted the random access preamble to the random access channel (RACH), to the downlink control channel (PDCCH), and transmits a random access response including the synchronization timing gap information, scheduling information, Tempolary C-RNTI and the signature ID number (or random ID) of the received preamble, to the downlink shared data channel (PDSCH) (message 2).

When confirming that a RA-RNTI exists in the downlink control channel (PDCCH), the mobile station apparatus checks the content of the random access response set in the downlink shared data channel (PDSCH) to extract the response including the signature ID number (or random ID) of the transmitted preamble.

Then, the mobile station apparatus corrects the synchronization lag and transmits L2/L3 message at least including a C-RNTI (or Temporary C-RNTI) through the scheduled radio resource (message 3).

Here, if the mobile station apparatus has kept waiting the random access response from the base station apparatus for a certain period of time but does not receive the random access response including the signature ID number of the transmitted preamble, the apparatus transmits the random access preamble once again.

When receiving the L2/L3 message from the mobile station apparatus, the base station apparatus transmits to the mobile station apparatus a contention resolution for determining whether there is a collision occurring between mobile station apparatuses, using the C-RNTI (or Tempolary C-RNTI) included in the received L2/L3 message (message 4). When the mobile station apparatus receives the contention resolution, synchronization between the mobile station apparatus and the base station apparatus is established.

Subsequently, the sequence example of the Non-contention based Random Access will be described with reference to FIG. 18.

First, the base station apparatus selects a signature, and transmits random access preamble allocation to the mobile station apparatus (message 1). The mobile station apparatus, using the given signature, transmits a random access preamble through the random access channel (RACH) (message 2).

When receiving the preamble from the mobile station apparatus, the base station apparatus calculates the synchronization time lag between the mobile station apparatus and the base station apparatus from the preamble, sets a RA-RNTI or C-RNTI that represents a response to the mobile station apparatus that transmitted the random access preamble to the random access channel (RACH), to the downlink control channel (PDSCH), and transmits a random access response including the synchronization time lag information (message 3). The mobile station apparatus corrects the synchronization time lag based on the received random access response. Thereby, synchronization between the mobile station apparatus and the base station apparatus is established.

Here, the signature used for Contention based Random Access and the signature used for Non-contention based Random Access are different.

Referring next to FIG. 19, the sequence at the time of handover of mobile station apparatus will be described taking an example in which the random access procedures are of Non-contention based Random Access.

At the preparation stage of handover, the mobile station apparatus measures the conditions of the radio waves on neighboring base station apparatuses and transmits the measurement report to the currently accessing base station apparatus or the handover originating base station apparatus. The handover originating base station apparatus, referring to the measurement report from the mobile station apparatus, selects the best-qualified handover target base station apparatus. Then, the base station apparatus transmits a handover request message to the selected handover target base station apparatus.

When receiving the handover request message from the handover originating base station apparatus, the handover target base station apparatus assigns a C-RNTI and a signature ID number to be used at the handover target base station apparatus to the mobile station apparatus to be handed over and transmits a handover request acknowledgement message including the C-RNTI and signature ID number as a response to the handover request, to the handover originating base station apparatus. The handover target base station also calculates the end time of the duration available for the signature corresponding to the signature ID and transmits the calculation included in the handover request acknowledgement message.

The handover originating base station apparatus extracts the C-RNTI, signature number and end time included in the handover request acknowledgement message, and transmits a handover command message included with the extracted C-RNTI, signature number and end time, to the mobile station apparatus (message 1).

When receiving the handover command message, the mobile station apparatus takes downlink synchronization with the handover target base station apparatus and checks the position of the random access channel (RACH) from the broadcast channel. The mobile station apparatus uses the signature given by the handover command message and transmits a random access preamble to the handover target base station apparatus through the random access channel (RACH) (message 2).

When detecting the signature from the random access channel (RACH), the handover target base station apparatus calculates the synchronization time lag to perform uplink scheduling for transmitting a handover complete message from the mobile station apparatus and transmits a random access response message including the synchronization information, scheduling information and signature ID number (message 3).

When receiving the random access response including the transmitted signature ID number, the mobile station apparatus corrects the synchronization timing lag from the synchronization information and transmits a handover complete message through the scheduled radio resource.

However, if no selectable signature has been left at the base station apparatus, there is a possibility of collision occurring, hence random access by Contention based Random Access may be used in some cases even through longer time is consumed for the random access procedures.

Non-patented document 1: 3GPP TS (Technical Specification)36.211, V1.10(2007-05), Technical Specification Group Radio Access Network, Physical Channel and Modulation (Release 8)

Non-patented document 2: 3GPP TS (Technical Specification)36.212, V1.20(2007-05), Technical Specification Group Radio Access Network, Multiplexing and channel coding (Release 8)

Non-patented document 3: R1-073436, Texas Instruments, "Random Access slot Configurations", 3GPP TSG RAN WG1 Meeting #50, Athens, Greece, 20-24 Aug., 2007

Non-patented document 4: 3GPP TS (Technical Specification) 36.300, V8.10(2007-06), Evolved Universal Terrestrial Radio Access (E-UTRA) and Evolved Universal Terrestrial Radio Access Network (E-UTRAN), Overall description Stage 2

DISCLOSURE OF INVENTION

Problems to be Solved by the Invention

At the time of handover, random access by Non-contention based Random Access is implemented, and the handover command message (message 1) also notifies the end time of the duration in which the signature corresponding to the signature number is available. This is done because how long it takes to perform downlink synchronization with the handover target base station apparatus and start transmitting the random access preamble (message 2) is unknown; only the end time is notified instead of notifying the start time and end time of the validity period of the signature when the duration to use the signature is transmitted.

However, notice of the end time only entails the problem that in the duration between the period for downlink synchronization and the actual validity period of the signature as well as in the time until handover completes (the duration until the handover complete message is received), the selected signature becomes unable to be used in the random access channel (RACH) by other mobile station apparatuses.

FIG. 20 is a diagram for illustrating the state of the random access channel (RACH). The state of the random access channel (RACH) is shown by taking time along the horizontal axis. Herein, in the duration from the reception of the handover command to the end time, the random access channel (RACH) is occupied by the very mobile station apparatus and cannot be used by any other mobile station apparatus.

That is, since the period until handover is completed is expected to be taken from about 100 ms to some 100 ms, the signature assigned to the mobile station apparatus cannot be used in this period by other mobile station apparatuses, hence there has been the problem that the usage efficiency of signatures available for Non-contention based Random Access is lowered.

Further, there is also a case in which the usage duration (end time) of the signature is not notified, but this case also has the problem that the random access channel (RACH) cannot be used by other mobile station apparatuses in the period until handover is completed.

In particular, the number of signatures used for Non-contention based Random Access is small. When the base station apparatus has a wide bandwidth, the number of random access channels (RACK) in one frame is increased so as to be equivalent in usage efficiency of the random access channel (RACH) to the case of a narrow bandwidth. Regarding this, if the random access channels (RACH) in the validity period of a signature are made to be available, there has been the problem that the usage efficiency for one signature becomes lower than that in the case of a narrower bandwidth.

When the signatures to be used for Non-contention based Random Access are all being used, the use of Contention based Random Access is directed to be undertaken. In this case, the random access procedures becomes longer, hence causing the problem that it takes longer time to connect compared to the case when Non-contention based Random Access is used.

Further, when a collision with another mobile station apparatus has occurred, it takes longer time to establish connection, causing the problem that smooth handover cannot be done.

In order to solve the above problems, it is an object of the present invention to provide a base station apparatus, a mobile station apparatus and a mobile communications system, which enable efficient communication by allotting the signature to other mobile station apparatuses even in the validity period of the signature between the base station apparatus and the mobile station apparatus.

Means for Solving the Problems

A base station apparatus according to the present invention is a base station apparatus which establishes uplink synchronization with a mobile station apparatus that transmits a random access preamble including a signature to a random access channel, comprising: a signature determining means for determining whether there is an unused signature when the base station apparatus determines that it is necessary to make a mobile station apparatus execute random access; and, a random access channel assigning means for, when the signature determining means has determined that there is the unused signature, assigning the signature and a random access channel available for the mobile station apparatus.

Also, the base station apparatus according to the present invention includes a signature validity period determining means for determining a validity period during which the signature is available for the mobile station apparatus, and wherein the random access channel assigning means is a means that assigns the random access channel to the mobile station apparatus based on the validity period.

Also, the base station apparatus according to the present invention includes an end time calculating means for calculating an end time of the validity period determined by the validity period determining means, and wherein the random access channel assigning means is a means with which the mobile station apparatus assigns the random access channel closet to the end time as a reference, among random access channels.

Also, the base station apparatus according to the present invention further includes a random access preamble allocation message transmitting means for transmitting a random access preamble allocation message including a signature number corresponding to the signature and the end time calculated by the end time calculating means, to the mobile station apparatus.

Also, the base station apparatus according to the present invention further includes a random access preamble allocation message transmitting means that transmits a random access preamble allocation message including the signature number and the random access channel assigned by the random access channel assigning means.

Also, the base station apparatus according to the present invention further includes a random access response reception time for determining a response reception time of random access with the mobile station apparatus in accordance with a transmission/reception band width used for communication with the mobile station apparatus and wherein the random access preamble allocation message transmitting means is a means that transmits the random access preamble allocation message further included with the random access response reception time.

A mobile station apparatus according to the present invention is a mobile station apparatus which establishes uplink synchronization with a base station apparatus by transmitting a random access preamble including a signature to a random access channel, comprising: a random access preamble allocation message receiving means for receiving a random access preamble allocation message including a signature number and end time; an extracting means for extracting the signature number and the end time from the random access preamble allocation message; and a random access channel determining means for determining a random access channel to be used, based on the end time.

Also, the mobile station apparatus according to the present invention is characterized in that the random access channel determining means is a means that determines random access channels to be used, based on the random access channel closest to the end time.

Also, the mobile station apparatus according to the present invention is characterized in that the random access preamble allocation message includes a random access response reception time, the extracting means is a means that also extracts the random access response reception time from the random access preamble allocation message, and, the random access determining means is a means that determines one random access channel every interval of the random access response reception time as the random access channel to be used, based on the random access channel closest to the end time.

A mobile station apparatus which establishes uplink synchronization with a base station apparatus by transmitting a random access preamble including a signature to a random access channel, further includes: a random access preamble allocation message receiving means for receiving a random access preamble allocation message including a signature number and a random access channel; and an extracting means for extracting the signature number and the random access channel from the random access preamble allocation message, wherein a random access preamble including the signature extracted by the extracting means is transmitted to the extracted random access channel to thereby establish uplink synchronization with a base station apparatus.

A mobile communications system according to the present invention is a mobile communications system including a base station apparatus for establishing uplink synchronization with a mobile station apparatus that transmits a random access preamble including a signature to a random access channel, wherein the base station apparatus includes: a signature determining means for determining whether there is an unused signature when the base station apparatus has received a random access preamble allocation message from the mobile station apparatus; an end time calculating means for determining a validity period during which the signature is available for the mobile station apparatus and calculates an end time of the validity period; and, a random access preamble allocation message transmitting means for transmitting a random access preamble allocation message including a signature number corresponding to the signature and the end time calculated by the end time calculating means, to the mobile station apparatus, the mobile station apparatus includes: a random access preamble allocation message receiving means for receiving the random access preamble allocation message; an extracting means for extracting the signature number and the end time from the random access preamble allocation message; and a random access channel determining means for determining a random access channel to be used, based on the end time, wherein the mobile station apparatus establishes uplink synchronization with the base station apparatus by transmitting a random access preamble including the signature corresponding to the signature number to the random access channel to be used.

Advantage of the Invention

According to the base station apparatus of the present invention, in the base station apparatus which establishes the uplink synchronization with the mobile station apparatus that transmits the random access preamble including the signature to the random access channel, when the base station apparatus determines the mobile station apparatus to need executing random access, it is determined whether there is the unused signature. When it is determined that there is the unused signature, the signature and the random access channel available for the mobile station apparatus are allotted. Accordingly, it is possible to provide a base station apparatus that can assign the signature to a plurality of mobile station apparatuses, instead of a single mobile station apparatus possessing the signature.

Further, according to the base station apparatus of the present invention, the end time of the validity period is calculated so that the random access channel to be used by the mobile station apparatus is allotted from the random access channels, with reference to the random access channel closest to the end time. Accordingly, the random access channel to be used by the mobile station apparatus is allotted within the validity period of the signature, based on the end time, hence a plurality of mobile station apparatuses can use the signature even during the validity period of the signature.

Further, the mobile station apparatus of the present invention, receives the random access preamble allocation message including the signature and the end time, extracts from the random access preamble allocation message, the signature and the end time, and determines the random access channel that can transmit the random access preamble including the signature, based on the extracted end time. Accordingly, the mobile station apparatus can perform pertinent communication based on the signature and the determined random access channel without regarding that the same signature is assigned to a plurality of mobile station apparatuses.

BRIEF DESCRIPTION OF DRAWINGS

FIG. 3 is a diagram showing one example of a data configuration of a signature allocation table in the first embodiment.

DESCRIPTION OF REFERENCE NUMERALS

1 Base station apparatus
   100 Data controller
   102 OFDM modulator
   104 Transceiver
   106 Synchronization timing measuring unit
   108 Inter-base station communicator
   110 Scheduler
      1102 DL scheduler
      1104 UL scheduler
      1106 Control data preparator
      1108 Signature allocator
      1110 Signature allocation table
   112 Channel estimator
   114 DFT-s-OFDM demodulator
   116 Control data extractor
   118 Preamble detector
5 Mobile station apparatus
   500 Data controller
   502 DFT-s-OFDM modulator
   504 Synchronization compensator
   506 Transceiver
   508 Preamble preparator
   510 Signature selector
   512 Scheduler
      5122 Control data analyzer
      5124 Control data preparator
      5126 UL scheduler
      5128 RACH calculator
   514 Channel estimator
   516 OFDM demodulator
   518 Control data extractor

BEST MODE FOR CARRYING OUT THE INVENTION

The mobile communications system using the base station apparatus to which the invention of the present application is applied will hereinbelow be described with reference to the drawings.

The First Embodiment

Figure 1:
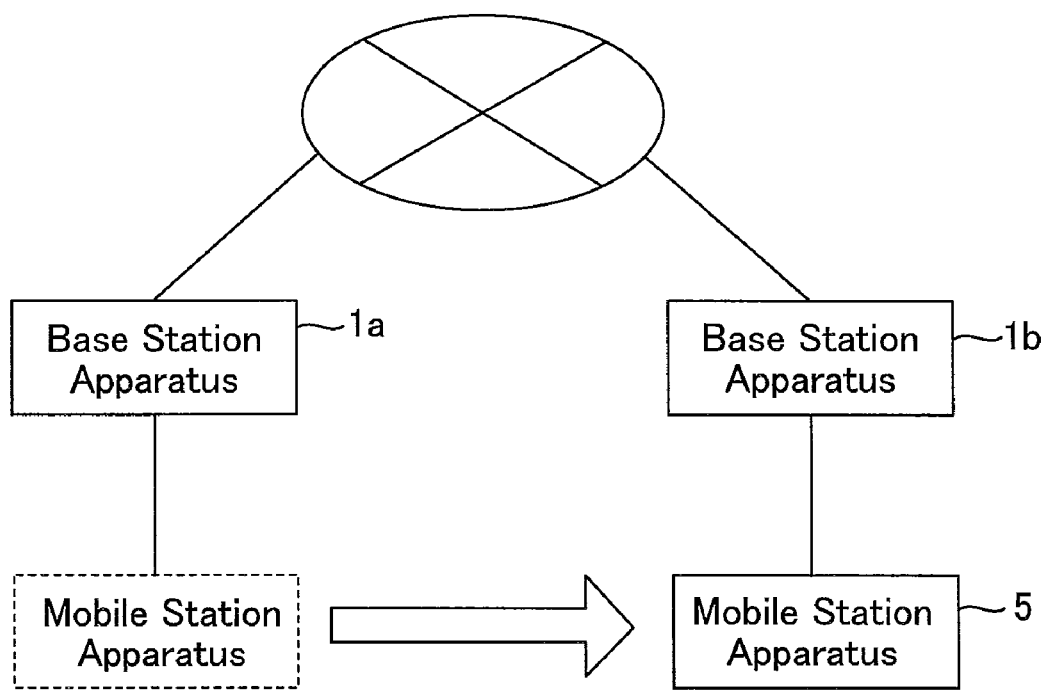
FIG. 1 is a diagram for illustrating the outline of a system in a first embodiment.

To begin with, FIG. 1 is a diagram showing the outline of a mobile communications system in the present embodiment. As shown in FIG. 1, in the present embodiment base station apparatuses 1 are connected to a communication network. In FIG. 1, a base station apparatus 1a and a base station apparatus 1b are connected. Also, a mobile station apparatus 5 can be connected to base station apparatuses 1.

Initially, mobile station apparatus 5 is connected to the network via base station apparatus 1a. Herein, mobile station apparatus 5 moves and is handed over to be connected to the network via base station apparatus 1b. Here, base station apparatus 1a is referred to as handover originating base station apparatus 1a and base station apparatus 1b as handover target base station apparatus 1b.

[Base Station Apparatus Configuration]

Figure 2:
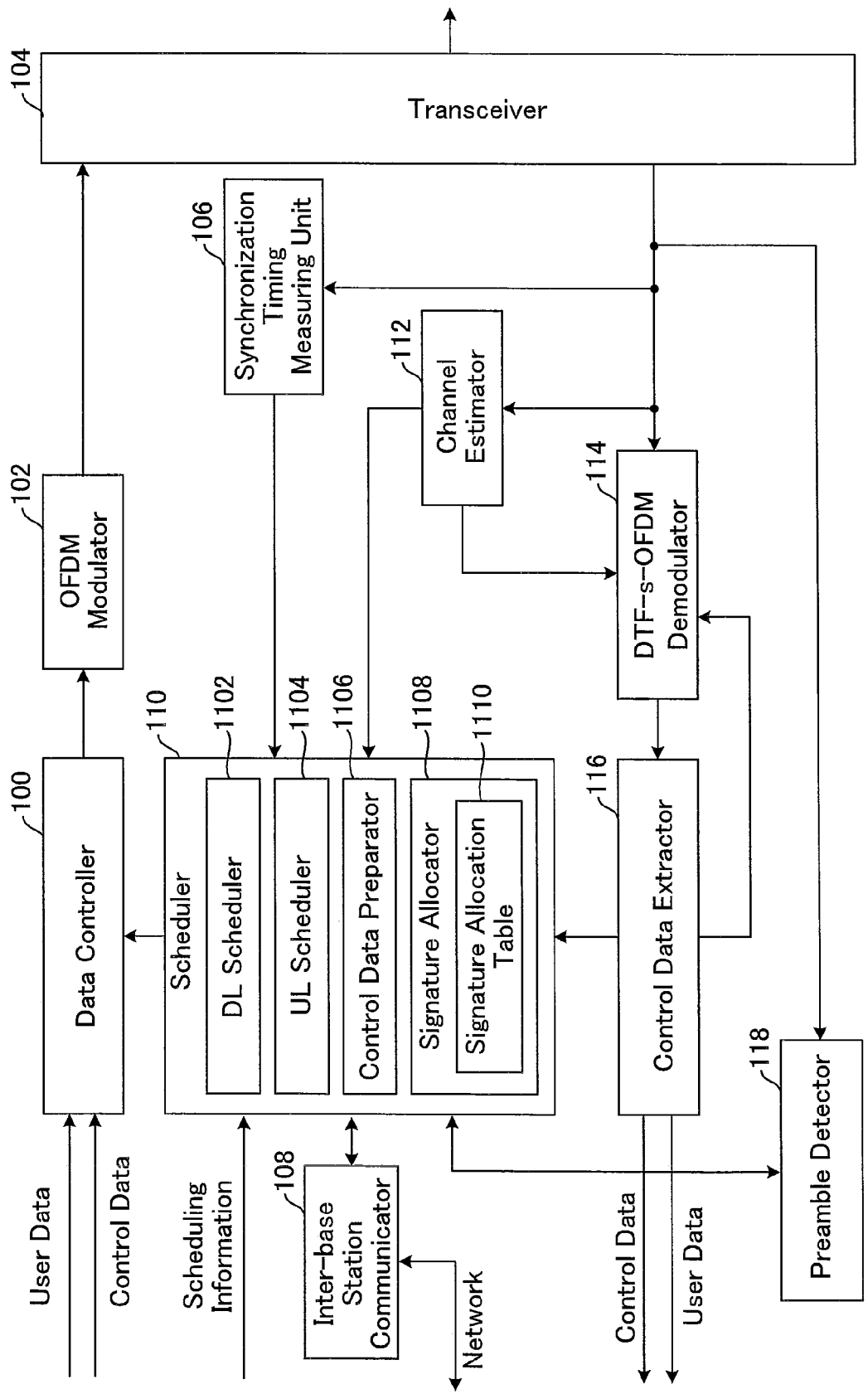
FIG. 2 is a diagram for illustrating the configuration of a base station apparatus in the first embodiment.

Next, the configuration of base station apparatus 1 will be described. As shown in FIG. 2, base station apparatus 1 includes a data controller 100, an OFDM modulator 102, a transceiver 104, a synchronization timing measuring unit 106, an inter-base station apparatus communicator 108, a scheduler 110, a channel estimator 112, a DFT-s-OFDM demodulator 114, a control data extractor 116 and a preamble detector 118.

Under the direction from scheduler 110, data controller 100 maps the input control data onto the downlink control channel (PDCCH), the downlink synchronization channel (DSCH), the downlink pilot channel (DPiCH) and the common control channel (CCPCH), and maps the user data for each mobile station apparatus and other control data onto the downlink shared channel (PDSCH).

OFDM modulator 102, based on the input signals, performs data modulation, serial/parallel conversion of the input signals, and OFDM signal processes such as IFFT (Inverse Fast Fourier Transform), CP (Cyclic Prefix) insertion, filtering and the like, to produce OFDM signals. The produced OFDM signals are output to transceiver 104.

Transceiver 104 upconverts the input data from OFDM modulator 102 into a radio frequency and transmits the data to mobile station apparatus 5. Transceiver 104 also receives the uplink data from mobile station apparatus 5 and downconverts the received data to base band signals and outputs the received data to synchronization timing measuring unit 106, channel estimator 112, DFT-s-OFDM demodulator 114 and preamble detector 118.

Synchronization timing measuring unit 106 is a functional unit that calculates an amount of gap in timing of synchronization from the uplink pilot channel (UPiCH) and reports the amount of gap in timing of synchronization as synchronization timing information to scheduler 110. Specifically, synchronization timing measuring unit 106 monitors the uplink pilot channel (UPiCH) to detect the amount of gap in timing from the difference between the arrival time of the pilot signal (reference signal) and the basic time.

Inter-base station apparatus communicator 108 is a functional unit that prepares a handover request message and a handover acknowledgement message to exercise communication between base station apparatuses. When a handover request message is received, a C-RNTI, a signature number and the end time are requested to scheduler 110. When a handover request acknowledgement message is received, the C-RNTI, signature and end time are noticed to scheduler 110.

Scheduler 110 includes a DL scheduler 1102 for performing downlink scheduling, a UL scheduler 1104 for performing uplink scheduling, a control data preparator 1106 and a signature allocator 1108.

DL scheduler 1102 is a functional unit that makes a schedule for mapping user data and control data onto each of the downlink channels, based on CQI information notified from mobile station apparatus 5, ACK/NACK information of downlink data, data information on each user notified from the upper layer, the control data prepared by control data preparator 1106 and the like.

UL scheduler 1104 is a functional unit that makes a schedule for mapping user data onto each of the uplink channels, based on the estimated result of the uplink radio propagation path from channel estimator 112 and the resource allocation request from mobile station apparatus 5.

Control data preparator 1106 prepares as control data an ACK/NACK signal from the valid or invalid sense of the uplink received data input from control data extractor 116, a random access response message from the result input from preamble detector 118 and a synchronization information message from the synchronization timing gap information input from synchronization timing measuring unit 106.

When requested for a signature and the end time from inter-base station apparatus communicator 108, signature allocator 1108 determines whether mobile station apparatus 5 should be made to execute random access under the initiative of the base station apparatus. Here, when mobile station apparatus 5 is made to execute random access under the initiative of the base station apparatus, the allocator calculates the end time of the signature, the signature to be used and the random access channel (RACH) to be used, and outputs the signature number and the end time to inter-base station apparatus communicator 108.

Here, signature allocator 1108 stores a signature allocation table 1110. Signature allocation table 1110 is a table that presents the usage conditions of random access channels (RACH) for the signatures that can be selected by base station apparatus 1. FIG. 3 shows one example of the data configuration of signature allocation table 1110.

In signature allocation table 1110 of FIG. 3, the vertical axis presents the usage condition of each signature and the horizontal axis presents the usage conditions of random access channels (RACH) in each frame. The table stores mobile station apparatuses allotted for respective signature numbers and RACH numbers in the frame. FIG. 3 is a table that is used when two RACHS exist in one frame, the table storing that, for example, a mobile station apparatus A and a mobile station apparatus B are allotted to the first (0-subframe) and the second (5 subframe), respectively for signature number "1". For signature number "3", a mobile station apparatus D is allotted to the first (0-subframe) while no mobile station apparatus is allotted to the second (5-subframe). Base station apparatus 1 can distinguish between the used and unused signatures and between the used and unused random access channels (RACH), and selects a signature and random access channel (RACH) among the unused signatures and random access channels (RACH) and notifies the selected information to mobile station apparatus 5.

Channel estimator 112 is a functional unit that estimates the radio propagation path characteristic from the pilot signal for demodulation of the uplink pilot channel (UPiCH) and outputs the result of ratio propagation path estimation to DTF-s-OFDM demodulator 114. The estimator also outputs the radio propagation path estimate result to scheduler 110 in order to make a schedule of the uplink from the pilot signal for measurement of the uplink pilot channel (UPiCH). Here, the uplink communication scheme is presumed to be a single carrier scheme such as DFT-Spread-OFDM or the like, but a multi-carrier scheme such as an OFDM scheme may be used.

DFT-s-OFDM demodulator 114 is a functional unit that subjects the input DFT-Spread-OFDM signals to DFT-s-OFDM signal processes such as DFT, sub-carrier mapping, IFFT, filtering and the like to obtain demodulated data signals.

Control data extractor 116 is a functional unit that checks the valid or invalid sense of the received data and notifies scheduler 110 of the check result. When the received data is valid, the extractor separates the received data into user data and control data and outputs. Here, among the control data, control data of layer 2 such as downlink CQI information, ACK/NACK of the downlink data, etc., is output to scheduler 110, whereas other control data such as layer 3 and the like and user data are output to the upper layer. When the received data is invalid, the data is stored in order to be combined with data to be resent, so that the data is combined when data to be resent is received.

Preamble detector 118 is a functional unit that calculates the amount of gap in timing of synchronization by detecting a preamble from the signal output from transceiver 104 and reports the signature number and the synchronization timing information based on the amount of gap in timing of synchronization, to scheduler 110.

[Configuration of Mobile Station Apparatus]

Figure 4:
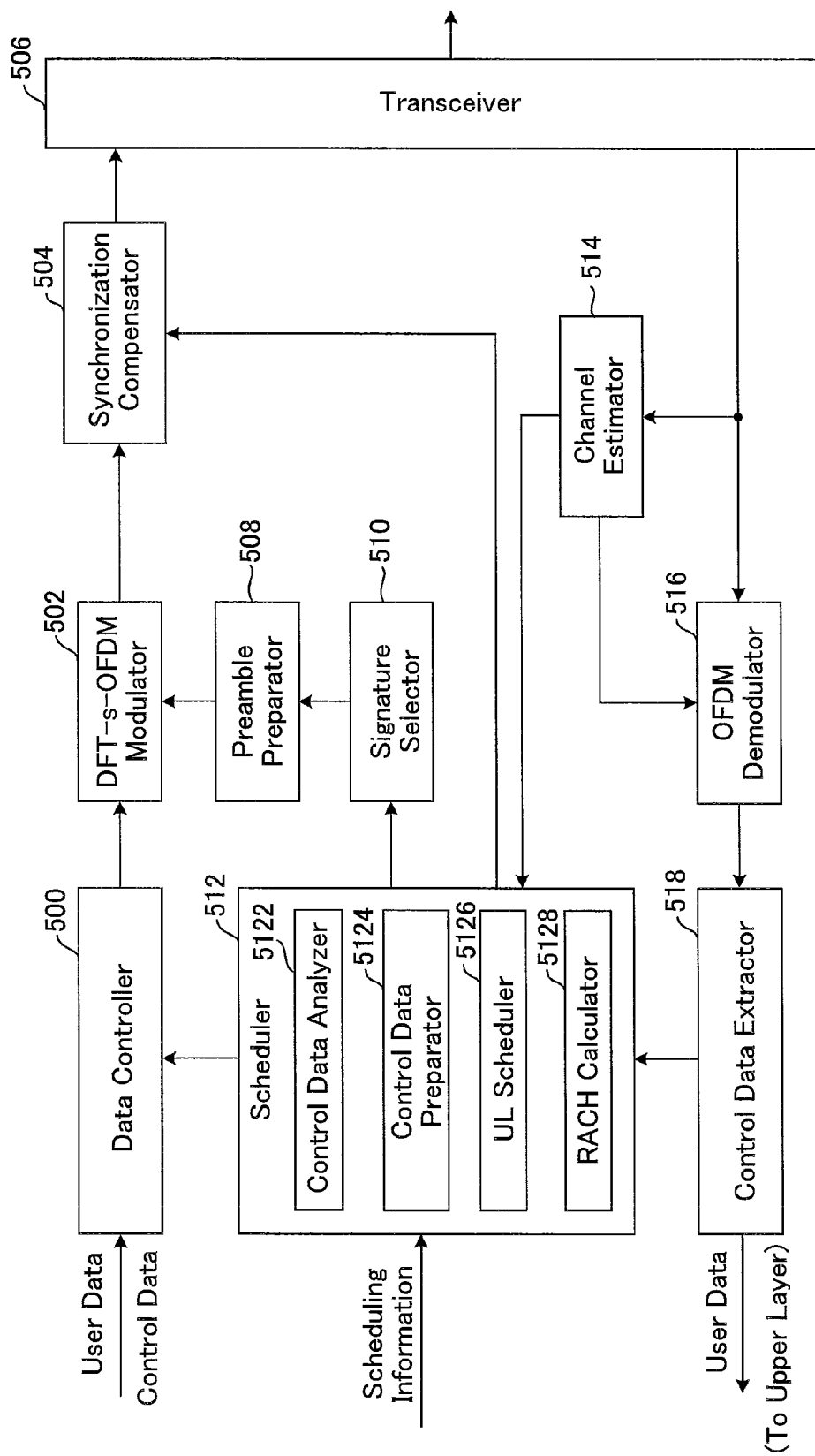
FIG. 4 is a diagram for illustrating the configuration of a base station apparatus in the first embodiment.

Referring next to FIG. 4, the configuration of mobile station apparatus 5 will be described. Mobile station apparatus 5 includes a data controller 500, a DFT-s-OFDM modulator 502, a synchronization compensator 504, a transceiver 506, a preamble preparator 508, a signature selector 510, a scheduler 512, a channel estimator 514, an OFDM demodulator 516 and a control data extractor 518.

Data controller 500 is arranged so that user data and control data input from the upper layer will be sent through the uplink shared channel (PUSCH) and the uplink control channel (PUCCH) by the direction from scheduler 512. Further, the pilot signal for measurement and the pilot signal for demodulation are arranged on the uplink pilot channel (UPiCH).

DFT-s-OFDM modulator 502 performs data modulation, and DFT-s-OFDM signal processing such as DFT, sub-carrier mapping, IFFT, CP (Cyclic Prefix) insertion, filtering and the like to prepare DFT-Spread-OFDM signals. The uplink communication scheme is presumed to be a singe carrier scheme such as DFT-Spread-OFDM, but a multi-carrier scheme such as an OFDM scheme may also be used.

Synchronization compensator 504 is a functional unit that receives the synchronization information extracted by control data extractor 518 by way of scheduler 512, corrects the transmission timing based on the synchronization information and outputs data that has been adjusted so as to match the transmission timing, to transceiver 506. That is, the timing (synchronization timing) between base station apparatus 1 and mobile station apparatus 5 is adjusted to enable pertinent communication.

Transceiver 506 sets up a radio frequency indicated by a radio controller (not shown), upconverts the signal input from synchronization compensator 504 to the radio frequency and transmits the signal to base station apparatus 1. Also, transceiver 506 receives the downlink data from base station apparatus 1, downconverts the data into baseband signals and outputs the received data to channel estimator 514 and OFDM demodulator 516.

Preamble preparator 508 is a functional unit that prepares a random access preamble including a signature corresponding to the signature number selected by signature selector 510 and outputs the preamble to DFT-s-OFDM modulator 502.

Signature selector 510 is a functional unit that selects a signature number to be used for random access by the direction from scheduler 512 and outputs the selected signature number to preamble preparator 508. Also, when a signature number is indicated from scheduler 512, the signature selector outputs the indicated signature number to preamble preparator 508.

Scheduler 512 includes a control data analyzer 5122, a control data preparator 5124, a UL scheduler 5126 and a RACH calculator 5128.

Control data analyzer 5122 analyzes control information input from control data extractor 518 and outputs scheduling information to UL scheduler 5126. Also, when the synchronization information includes synchronization information identification information that indicates new synchronization information, the analyzer outputs synchronization timing gap information to synchronization compensator 504.

Control data preparator 5124 prepares ACK signals and NACK signals and other control data and outputs these signals and data to data controller 500. Further, UL scheduler 5126, based on the scheduling information, controls the resources having the uplink shared channel (PUSCH) and the uplink control channel (PUCCH) allocated.

RACH calculator 5128 calculates the positions of the random access channels (RACH) from the random access-related information notified by the common control channel (CCPCH). Further, the RACH calculator is a functional unit that, in the case of random access such as a handover command etc., that is indicated by base station apparatus 1, calculates the random access channels (RACH) available based on the notified end time.

Further, scheduler 512 instructs signature selector 510 to perform random access when directed from the upper layer.

Channel estimator 514 is a functional unit that estimates the radio propagation path characteristic from the downlink pilot channel (DPiCH) and outputs the estimation result to OFDM demodulator 516. The channel estimator also performs conversion into CQI information for notifying base station apparatus 1 of the radio propagation path estimation result and outputs the CQI information to scheduler 512.

OFDM demodulator 516 is a functional unit that demodulates the received data input from transceiver 506 based on the radio propagation path estimation result from the channel estimator.

Control data extractor 518 is a functional unit that separates the received data input from OFDM demodulator 516 into user data and control data. Here, the uplink synchronization information, the scheduling information and other control data of layer 2 are output to scheduler 512 and other user data is output to the upper layer.

[Processing in Base Station Apparatus]

Figure 5:
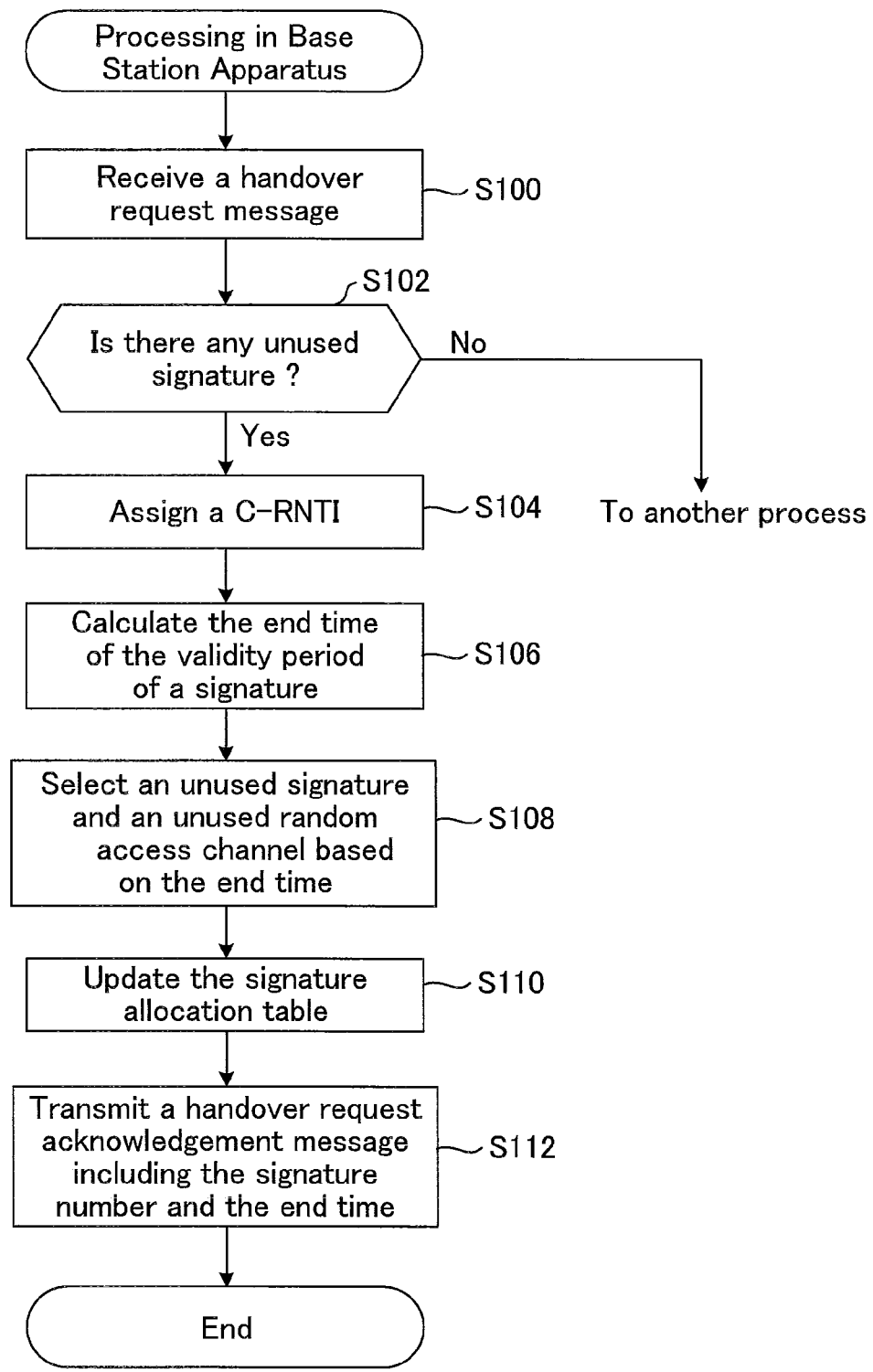
FIG. 5 is an operational flow for illustrating the process of the base station apparatus in the first embodiment.

Next, the processing in base station apparatus 1 will be described. FIG. 5 is a chart for illustrating the process executed by base station apparatus 1 using the operational flow. The operation of the base station apparatus illustrated in FIG. 5 is that of the base station apparatus to be the handover target (handover target base station apparatus 1b).

First, when receiving a handover request message from another base station apparatus (handover originating base station apparatus 1a) (Step S100), base station apparatus 1 determines whether there is any unused signature that has not been allotted to any mobile station apparatus, from signature allocation table 1110 (Step S102).

Here, when there is an unused signature (Step S102; Yes), a C-RNTI of mobile station apparatus 5 is assigned (Step S104). Subsequently, the end time of the validity period of the signature is calculated (Step S106). Here, the validity period of the signature is a duration that enables a plurality of transmissions of random access preamble on the assumption that transmission of random access preamble may fail several times. Specifically, various methods can be considered to calculate the validity period of signature: for example, the period is set at A msec. for handover while the period is set at B msec. for other cases; or as another method, the validity period of signature is previously set depending on the type or depending on the traffic of the mobile station apparatus, and the time added with a period of time to be expected to establish downlink synchronization is adopted as the validity period.

Subsequently, in response to the calculated end time, an unused signature and an unused random access channel (RACH) are selected (Step S108). In the case of the present embodiment, an unallotted location is searched in signature allocation table 1110, and the thus found location is selected.

For example, in signature allocation table 1110 in FIG. 3, the 1st random access channel (RACH) with signature number "2", the 2nd random access channel (RACH) with signature number "3", the 1st random access channel (RACH) with signature number "6" and the 2nd random access channel (RACH) with signature number "8" are unallotted. Among these unallotted channels, one random access channel is selected and allotted with mobile station apparatus 5.

Subsequently, based on the information on the mobile station apparatus 5 thus allotted, signature allocation table 1110 is updated (Step S110). Then, with respect to mobile station apparatus 5, base station apparatus 1 transmits a handover message request acknowledgement message including the C-RNTI, signature number and end time, to base station apparatus 1a (Step S112).

Here, when receiving the handover request acknowledgement message, base station apparatus 1a extracts the C-RNTI, signature number and end time included in the handover request acknowledgement message, and transmits a handover command message (also called a random access preamble allocation message) included with the extracted C-RNTI, signature number and end time, to mobile station apparatus 5.

Here, it is assumed in the present embodiment that signature number "2" is included as the used signature and the 1st random access channel (RACH) in X-frame is included as the end time in the handover request acknowledgement message.

It should be noted that, when a handover complete message is received from mobile station apparatus 5 to which the selected signature was allotted, or when the validity period of the signature reaches the end time, the signature and the random access channel (RACH) are freed up as being unused.

Further, at Step S112, when there is no unused signature, a handover request acknowledgement message included with the information that indicates that Contention based Random Access should be undertaken, is transmitted to base station apparatus 1a. Base station apparatus 1a transmits a handover command message included with the information that indicates that Contention based Random Access should be undertaken, to mobile station apparatus 5.

[Operation of Mobile Station Apparatus]

Figure 6:
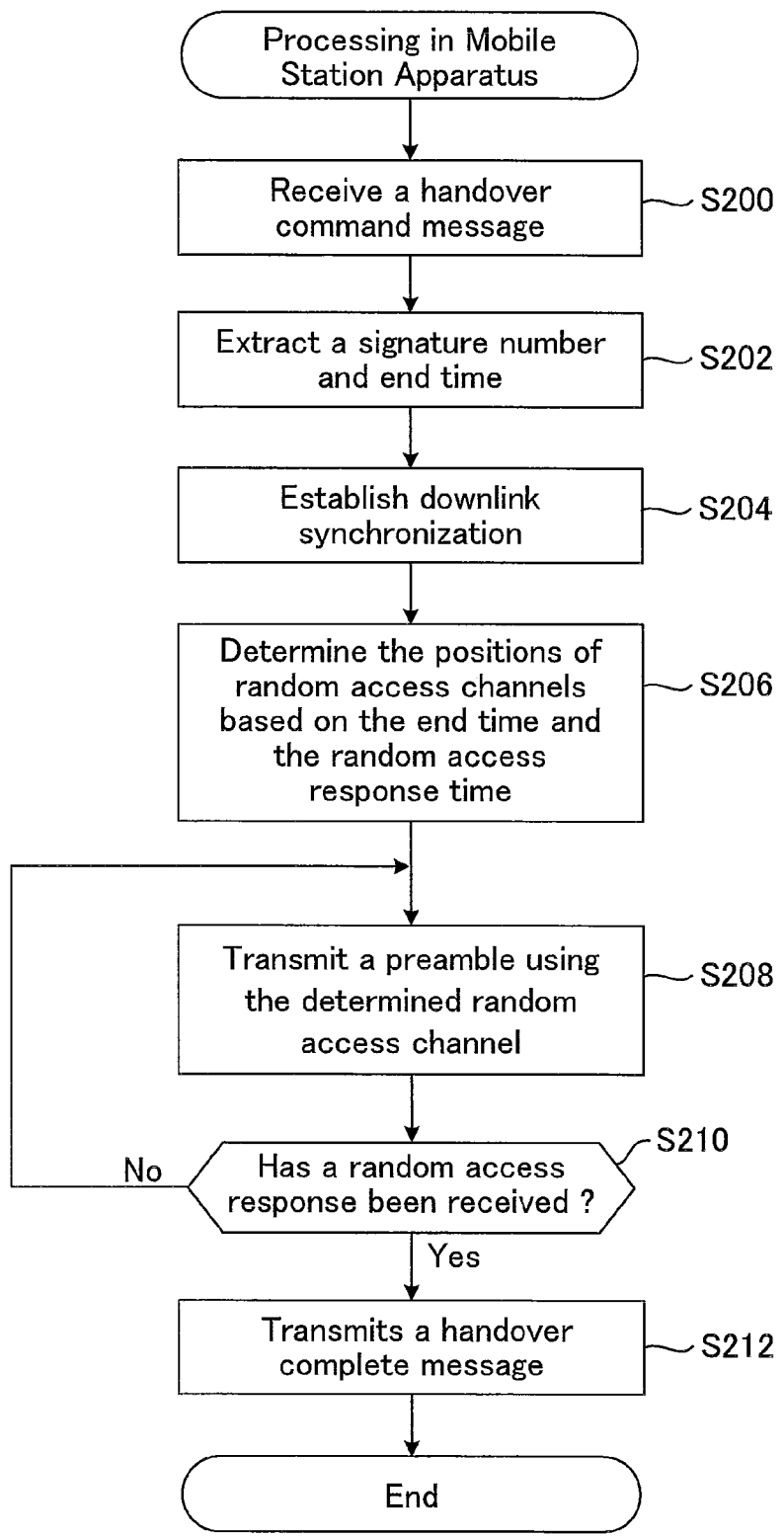
FIG. 6 is an operational flow for illustrating the process of the mobile station apparatus in the first embodiment.

Next, the process in mobile station apparatus 5 will be described. FIG. 6 is a chart for illustrating the process executed by mobile station apparatus 5, using the operational flow. First, mobile station apparatus 5 receives a handover command message (also called a random access preamble allocation message) from base station apparatus 1a to be the handover origination (Step S200).

Subsequently, the mobile station extracts the signature number and end time included in the received handover command message (Step S202). Then, mobile station apparatus 5 establishes downlink synchronization with base station apparatus 1 (the handover target base station apparatus 1b in this case) (Step S204).

At this point, the position of random access channel (RACH) is determined based on the end time extracted at Step S202 and the access response time in mobile station apparatus 5 (Step S206). Here, as the end time, the end time of the validity period of the signature may be used, or the frame number, the subframe number and the like may be given notice.

Describing specifically, first, based on the signature number, the signature of the random access channel (RACH) to be used when base station apparatus 1 and mobile station apparatus 5 achieve uplink synchronization is determined.

Next, the validity period of the signature is determined based on the end time. In this case, the random access channel (RACH) that is closest to the end time is used as the random access channel (RACH) to be used by mobile station apparatus 5 and base station apparatus 1. How often or for every how many frames, one random access channel (RACH) is used, is also determined in accordance with the access response time.

For example, in the present embodiment, the end time falls at the 1st random access channel (RACH) of X-frame. In this case, the random access channel (RACH) that can be used by mobile station apparatus 5 is determined to be the closest one or "0-subframe in (X−1)-frame". Further, in accordance with the access response time, "0-subframe in (X−2)-frame", . . . , "0-subframe in S frame" (S frame is the first frame after reception of the handover command message) are determined.

Then, the determined random access channel (RACH) is used to transmit a random access preamble to base station apparatus 1b (Step S208). For example, when the random access channel (RACH) at 0-subframe has been determined, the random access preamble is transmitted using the random access channel (RACH) at 0-subframe. Then, if no random access response including the used signature number has been received within the random access response reception time, the random access preamble is once again transmitted through the random access channel (RACH) at 0-subframe in the next frame.

Then, when receiving the random access response (Step S210; Yes), the mobile station apparatus transmits a handover complete message to handover target base station apparatus 1b, using the resource of the designated uplink shared channel (PUSCH) (Step S212).

[Operations of Mobile Station Apparatus and Base Station Apparatus]

Figure 7:
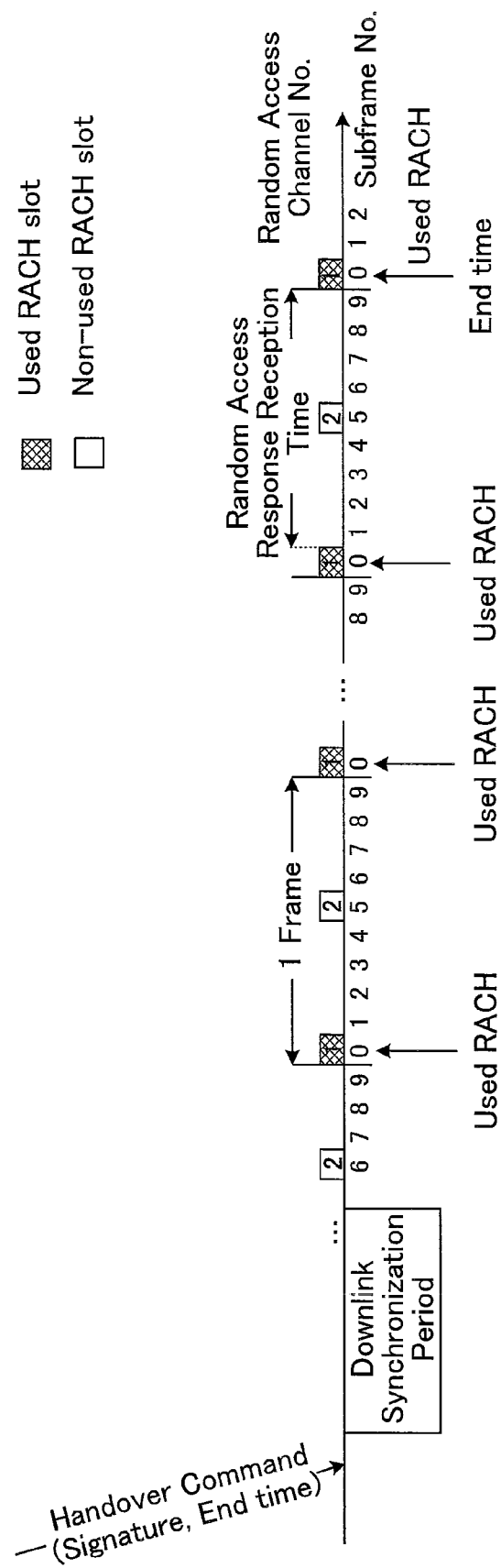
FIG. 7 is a diagram for illustrating the operation in the first embodiment.

The operations will be described with reference to FIG. 7. FIG. 7 is a diagram schematically showing the conditions of the random access channels (RACH). In FIG. 7, the horizontal axis represents time, and a case is shown where there are two random access channels (RACH) (one every 5 ms) in one frame (10 ms) and the random access response reception time is 9 ms.

Here, the random access response reception time means a period of time including the process time taken for mobile station apparatus 5 to transmit a random access preamble; and the process time taken for base station apparatus 1 to detect the random access preamble, prepare a random access response and transmit the response to mobile station apparatus 5 until the response is received.

Mobile station apparatus 5, using the signature corresponding to the signature number included in the received handover command, determines the positions of the random access channels (RACH) from the end time and the random access response reception time (Step S206 in FIG. 6).

That is, first, the random access channel (RACH) that is closest to the notified end time is determined to be the random access channel (RACH) to be used. In the case shown in FIG. 7, the point of time at the 0-subframe corresponds to the end time, the random access channel (RACH) "1" (at 0 frame) is used in mobile station apparatus 5.

Subsequently, referring to the random access response reception time, in the case of FIG. 7, the random access channels (RACH) can be used at intervals of 9 ms, and for one signature, the random access channels (RACH) at the 0-subframe in each frame and at the 5-subframe in each frame can be allotted to different mobile station apparatuses. That is, when the 0-subframe in X-frame is notified as the end time, the random access channel (RACH) at 0-subframe in X-frame becomes the point of reference.

Then, the 0-subframe in (X−1)-frame, located before the random access response reception time 9 ms, the 0-subframe in (X−2)-frame, two frames before, . . . the 0-subframe in S-frame (S frame is the first frame after reception of the handover command message) are determined to be the random access channel (RACH) to be used. With this, it is possible to let another mobile station apparatus use the random access channel (RACH) at 5-subframe in the frames from S-frame to X-frame, hence the usage efficiency of a signature can be doubled in this case.

After transmission of a random access preamble, mobile station apparatus 5 is not allowed to re-send the random access preamble at least within the duration for receiving a random access response. That is, in the random access channels (RACH) within this period, the signature selected by base station apparatus 1 will be assigned to another mobile station apparatus so that it is possible to realize efficient use of signatures.

As in the present embodiment, when, based on the random access channel (RACH) designated based on the end of the time (the end time of random access) in which a signature can be used, the random access channel (RACH) is used at intervals of the random access response reception time, the unused random access channels (RACH) can be used by other mobile station apparatuses. Accordingly, the same signature can be efficiently used by a plurality of mobile station apparatuses.

Variational Example

20 MHz Band Configuration

Though the above embodiment was described taking a case in which random access channels (RACH) are calculated based on the interval of the random access response reception time, there occurs no particular problem as long as the random access channels (RACH) to be used are calculated based on the interval of time equal to or greater than the random access response reception time.

Further, the above embodiment was described referring to 10 MHz band configuration, where there are two random access channels (RACH). However, there may be a plurality of random access channels (RACH) in one frame.

Figure 8:
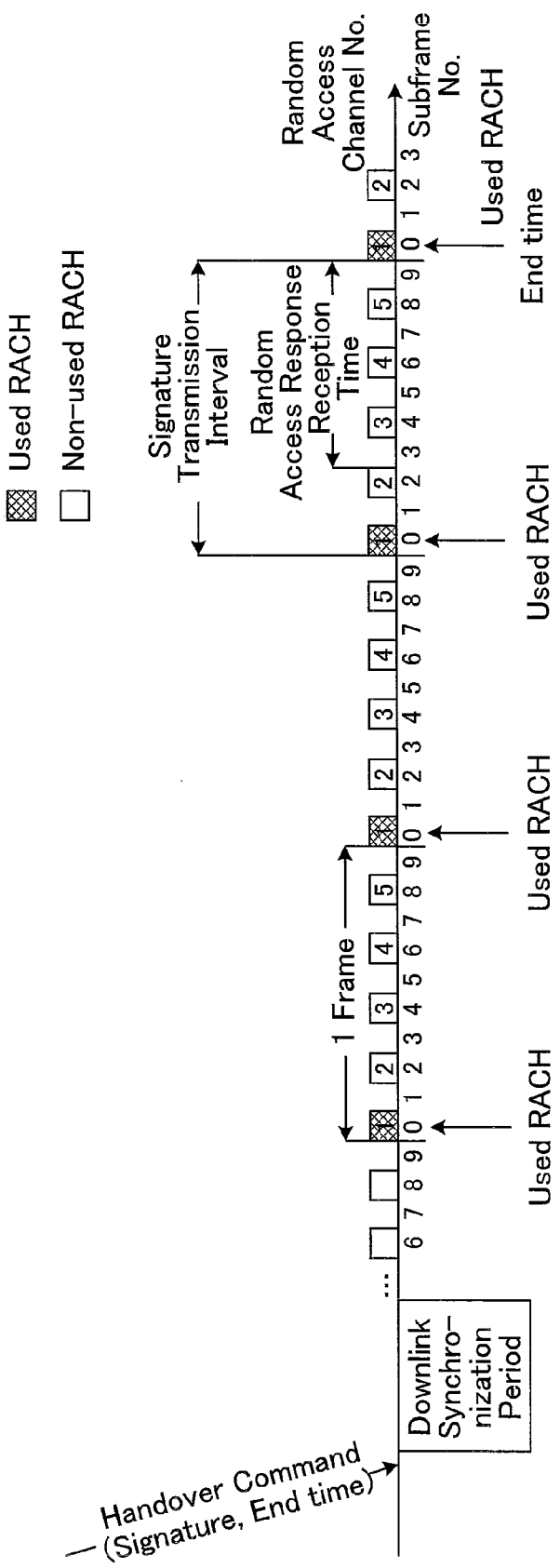
FIG. 8 is a diagram for illustrating the operation in the first embodiment.

For example, a 20 MHz band configuration is shown in FIG. 8. As shown in FIG. 8, suppose that there are five random access channels (RACH) (one channel every 2 ms) in one frame (10 ms) and the random access response reception time is 7 ms. In this case, when the end time falls at 0-subframe in X-frame, 0-subframe in X-frame, 2-subframe in (X−1)-frame, 4-subframe in (X−2)-frame, 6-subframe in (X−3)-frame, . . . , 2×N (mod) 10-subframe in (X−N)-frame (here N is an integer, and x (mod) y indicates the remainder after dividing x by y.) are determined as the random access channels (RACH) to be used. In this case, signature allocation at the base station apparatus becomes complicated.

In such a case, even when the random access response reception time is 7 ms, the random access response reception time may be set at 9 ms, for example, or the signature transmission interval may be set at 9 ms (7 ms+2 ms) that is equal to or greater than the random access response reception time, so that one random access channel (RACH) can be transmitted every frame.

In this case, base station apparatus 1 may be adapted to give notice of the random access response reception time or the signature transmission interval to the mobile station apparatus by including the time or interval in the common control channel (CCPCH), the handover request acknowledgement message, the handover command message or other control data.

Also, the random access response reception time or the signature transmission interval may be made longer so as to allocate the signature to a more number of mobile station apparatuses.

(5 MHz Band Configuration)

Figure 9:
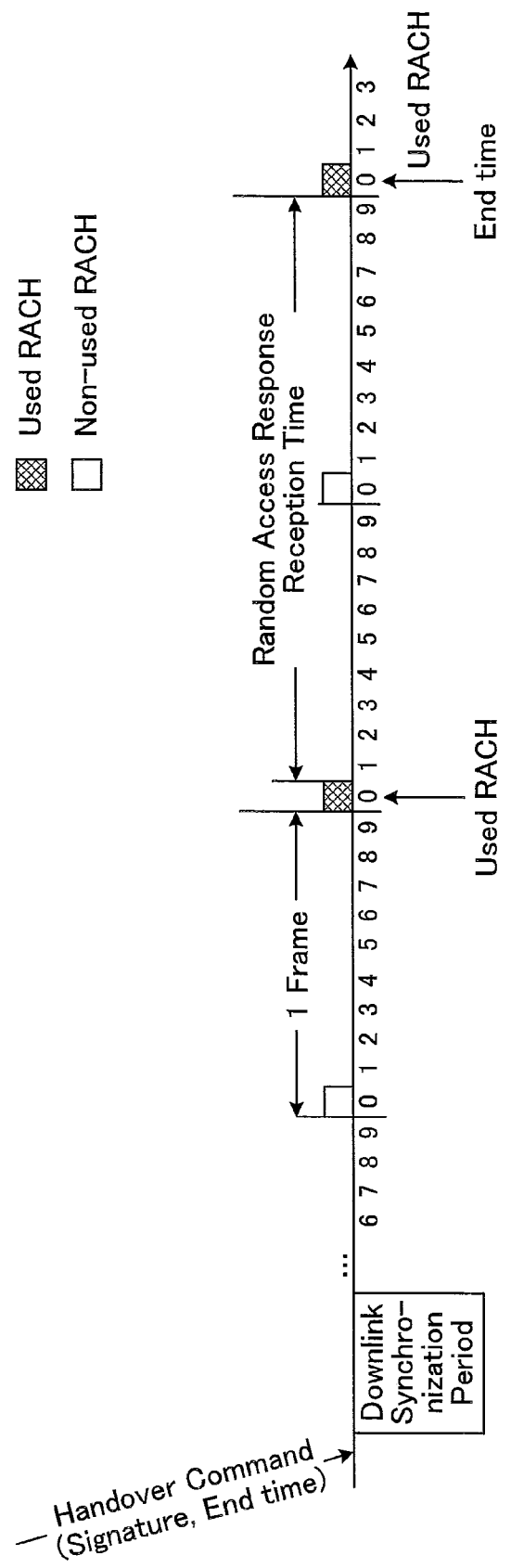
FIG. 9 is a diagram for illustrating the operation in the first embodiment.

Also, a case where the random access response reception time is longer than one frame may be possible. For example, FIG. 9 is a diagram showing a situation of a 5 MHz band configuration. The random access response reception time is the sum of the processing time for mobile station apparatus 5 to transmit a random access preamble and for base station apparatus 1 to detect the random access preamble, prepare a random access response and transmit the response to mobile station apparatus 5 and a amount of the time of some subframes so as to enable appropriate scheduling in the frequency and time domains.

Figure 10:
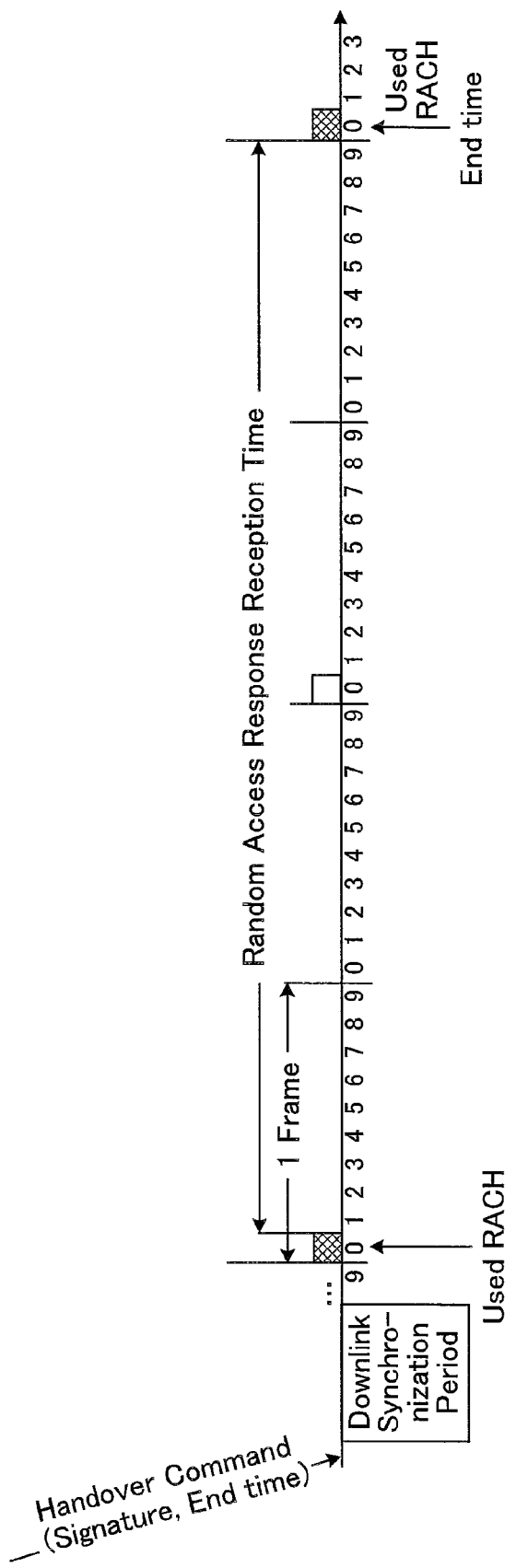
FIG. 10 is a diagram for illustrating the operation in the first embodiment.

Here, when the usage band of base station apparatus 1 is 5 MHz, one random access channel (RACH) is given every one frame (10 ms). Also, as shown in FIG. 10, when the usage band of base station apparatus 1 is 1.25 MHz, one random access channel (RACH) is given every two frames (20 ms). Accordingly, it is only possible to assign one signature to one mobile station apparatus within the designated duration.

When the usage band of base station apparatus 1 in the figure is 5 MHz, it becomes possible to allot different mobile station apparatuses to the RACH in X-frame and the RACH in (X−1)-frame by setting the random access response reception time at 19 ms (9 ms+10 ms).

Further, FIG. 10 is a diagram showing the case where the usage band of base station apparatus 1 is 1.25 MHz. In this case, it is possible to use one signature for a plurality of mobile station apparatuses by setting the random access response reception time at 39 ms (9 ms+30 ms).

In this way, by changing the random access response reception time depending on the transmission band of base station apparatus 1, it becomes possible to adapt scheduling of the random access response in a more flexible manner.

Since the random access response reception time changes depending on the transmission bandwidth of base station apparatus 1, the random access response reception time is notified to the mobile station apparatus through the common control channel (CCPCH), or notified to the mobile station apparatus by including the time in the handover request acknowledgement message, handover command message or other control data. It should be noted that the random access of Non-contention based Random Access and the random access of contention based Random Access may use different random access response reception times.

That is, at Step S112 in FIG. 5, base station apparatus 1 transmits a handover request acknowledgement message included with the random access response reception time to base station apparatus 1a. Then, base station apparatus 1a transmits a handover command message (also called random access preamble allocation message) included with the random access response reception time. Then, at Step S202, mobile station apparatus 5 extracts the random access response reception time from the handover command message that was received at Step S200. Thereafter, at Step S206, the mobile station apparatus determines the positions of the random access channel (RACH).

The Second Embodiment

Next, the second embodiment will be described. The first embodiment is constructed such that random access channels (RACH) can be selected to use at intervals of the random access response reception time or at intervals of signature transmission, based on the random access channel (RACH) that is designated by the end time, whereby the random access channels (RACH) being unused are permitted to be used by other mobile station apparatuses and the same signature can be used by a plurality of mobile station apparatuses.

Herein, the configuration (time and allocation) of random access channels (RACH) is the same in every frame. The second embodiment will be described taking a case where the signature transmission interval is set in units of the frame interval such as one frame interval (9 ms), two frame interval (19 ms) or the like, and the random access channel (RACH) number or random access channel (RACH) subframe number to be used is notified so as to use random access channels (RACH) and the signature at regular intervals. Here, the signature transmission time is assumed to be equal to or longer than the random access reception time.

Here, the configurations of base station apparatus 1 and mobile station apparatus 5 are the same as in the first embodiment, so that description of these is omitted.

[Processing in Base Station Apparatus]

First, the processing in the base station apparatus will be described using the operational flow in FIG. 11. Here, the same processes as in the first embodiment are allotted with the same reference numerals and detailed description is omitted.

When receiving a handover request message (Step S100), it is determined whether there is any unused signature in signature allocation table 1110 (Step S102). Here, when there is an unused signature (Step S102; Yes), a C-RNTI is assigned (Step S104), and the end time of the validity period of the signature is calculated (Step S106).

In response to the calculated end time, an unused signature and unused random access channels (RACH) are selected (Step S108), and signature allocation table 1110 is updated (Step S110).

Thereafter, base station apparatus 1 transmits a handover request acknowledgement message including the C-RNTI and signature number and RACH number, to base station apparatus 1a (Step S150). Here, when receiving the handover request acknowledgement message, base station apparatus 1a extracts the C-RNTI, signature number and RACH number included in the handover request acknowledgement message, and transmits a handover command message (also called a random access preamble allocation message) included with the extracted C-RNTI, signature number and RACH number, to mobile station apparatus 5.

[Processing in Mobile Station Apparatus]

Figure 12:
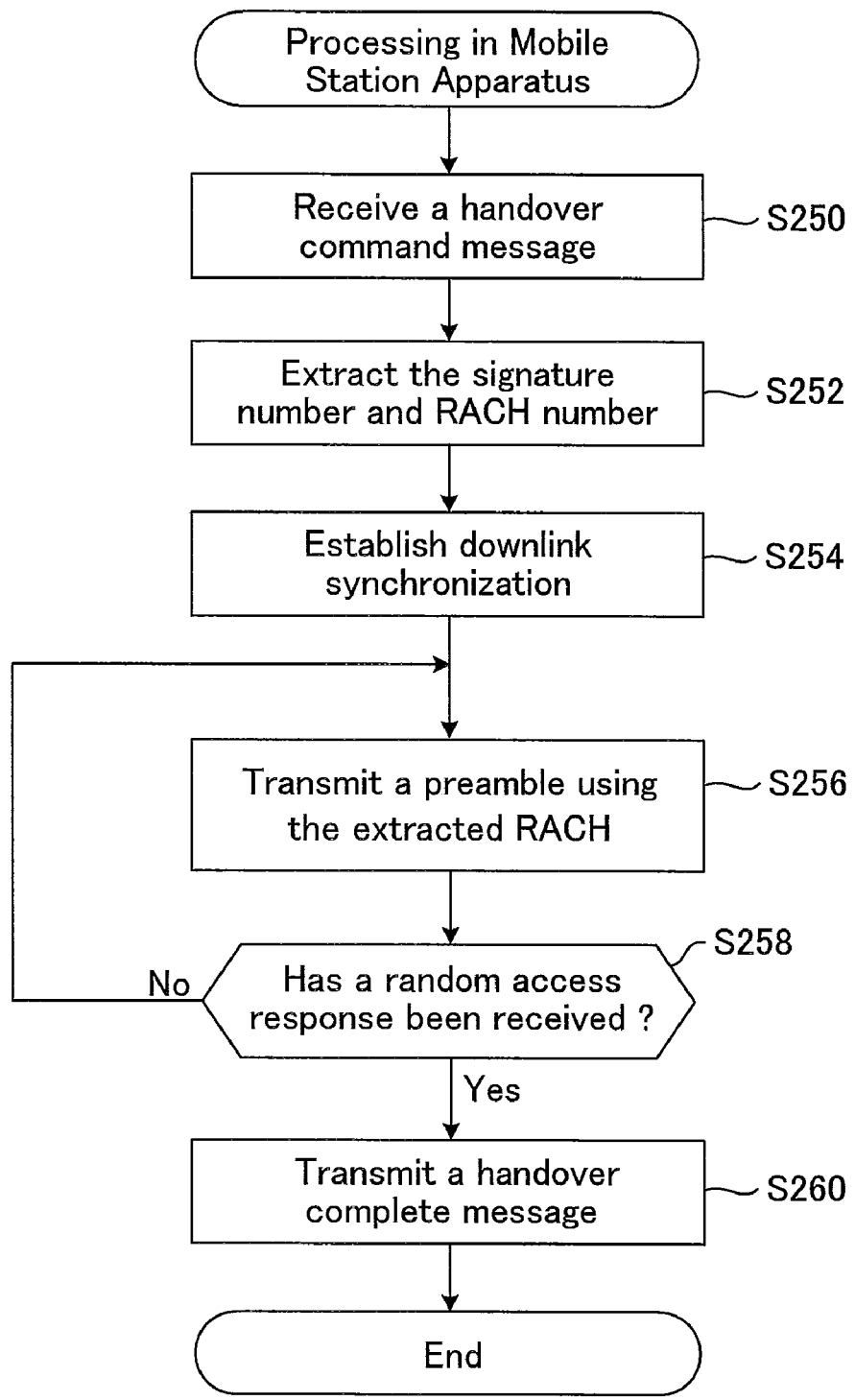
FIG. 12 is an operational flow for illustrating the process of a mobile station apparatus in the second embodiment.

Next, the process in mobile station apparatus 5 will be described. FIG. 12 is a chart for illustrating the process executed by mobile station apparatus 5, using the operational flow. First, mobile station apparatus 5 receives the handover command message (also called a random access preamble allocation message) from base station apparatus 1a to be the handover origin (Step S250).

Subsequently, the mobile station extracts the signature number and random access channel (RACH) number included in the received handover command message (Step S252). Then, mobile station apparatus 5 establishes downlink synchronization with base station apparatus 1 (the handover target base station apparatus 1b) (Step S254).

At this point, the random access channels (RACH) to be used are determined based on the signature number and RACH number extracted at Step S252. Then, a random access preamble is transmitted to base station apparatus 1b through the closest detected random access channel (RACH), using the determined random access channels (RACH) (Step S256). When no random access response including the used signature number has been received within the random access response time, the random access preamble is once again transmitted through the random access channel (RACH) determined in the next frame.

Then, when receiving the random access response (Step S258; Yes), the mobile station apparatus transmits a handover complete message to handover target base station apparatus 1b using the resource of the designated uplink shared channel (PUSCH) (Step S260).

[Operations of Mobile Station Apparatus and Base Station Apparatus]

Figure 13:
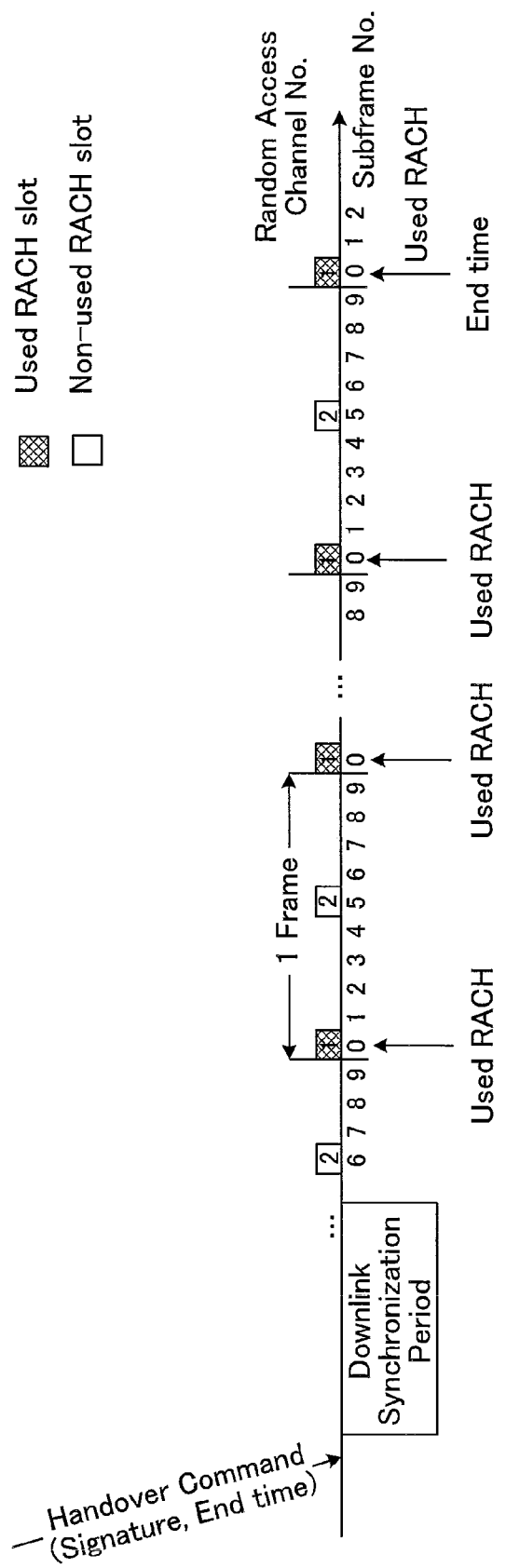
FIG. 13 is a diagram for illustrating the operation in the second embodiment.
Figure 14:
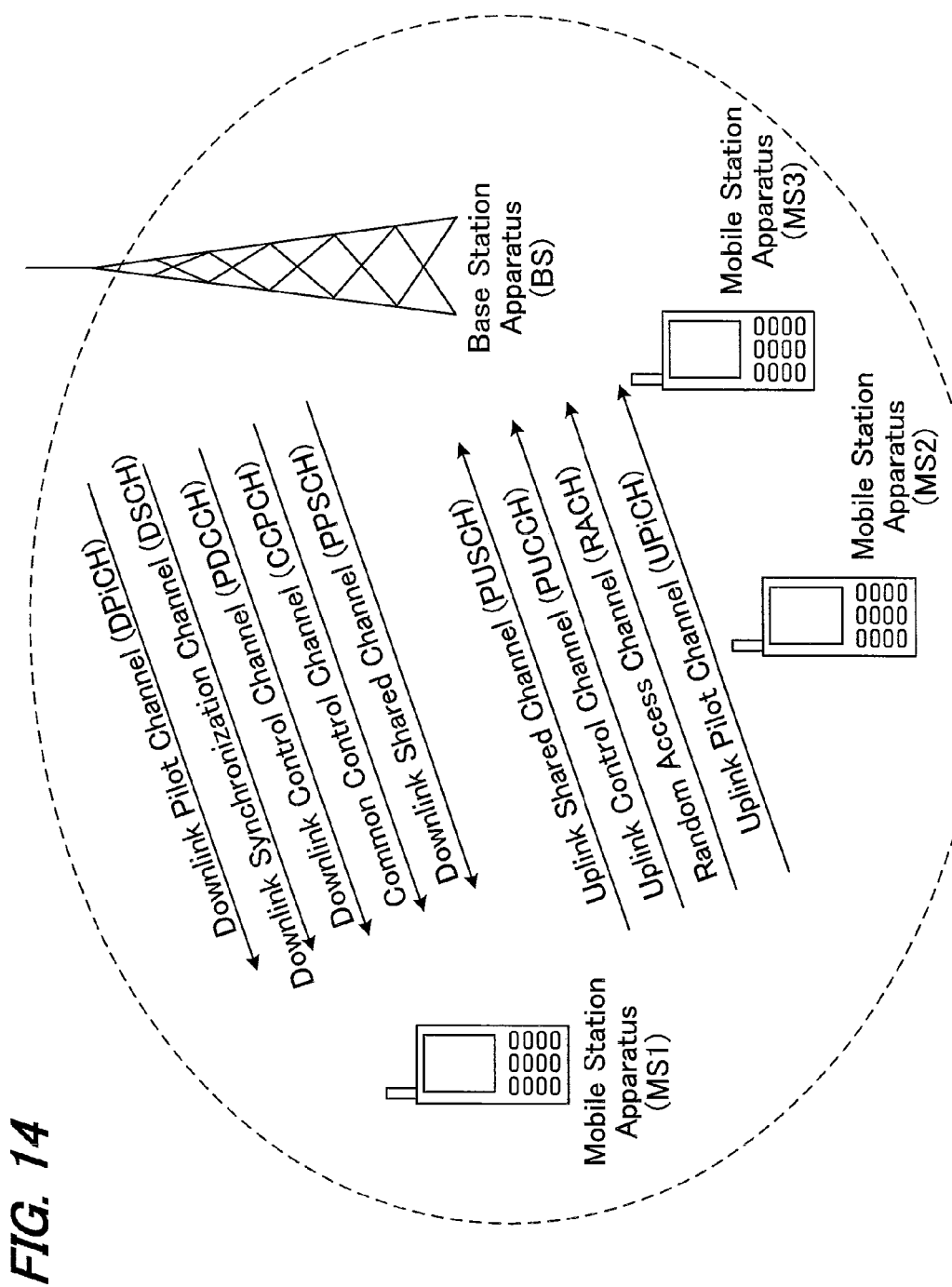
FIG. 14 is a diagram for illustrating a channel configuration of EUTRA in the background technology.
Figure 15:
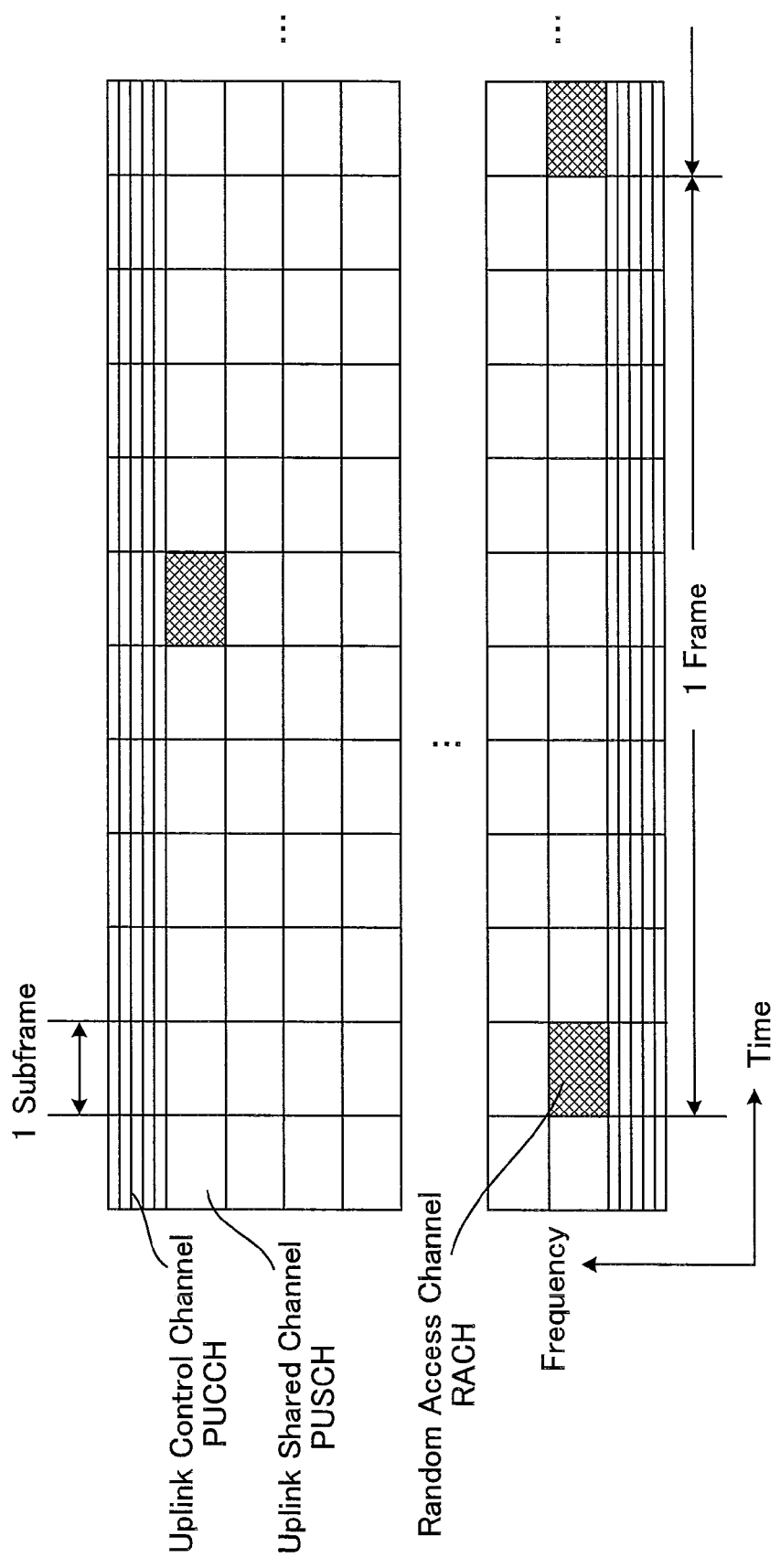
FIG. 15 is a diagram for illustrating random access channels in the background technology.
Figure 16:
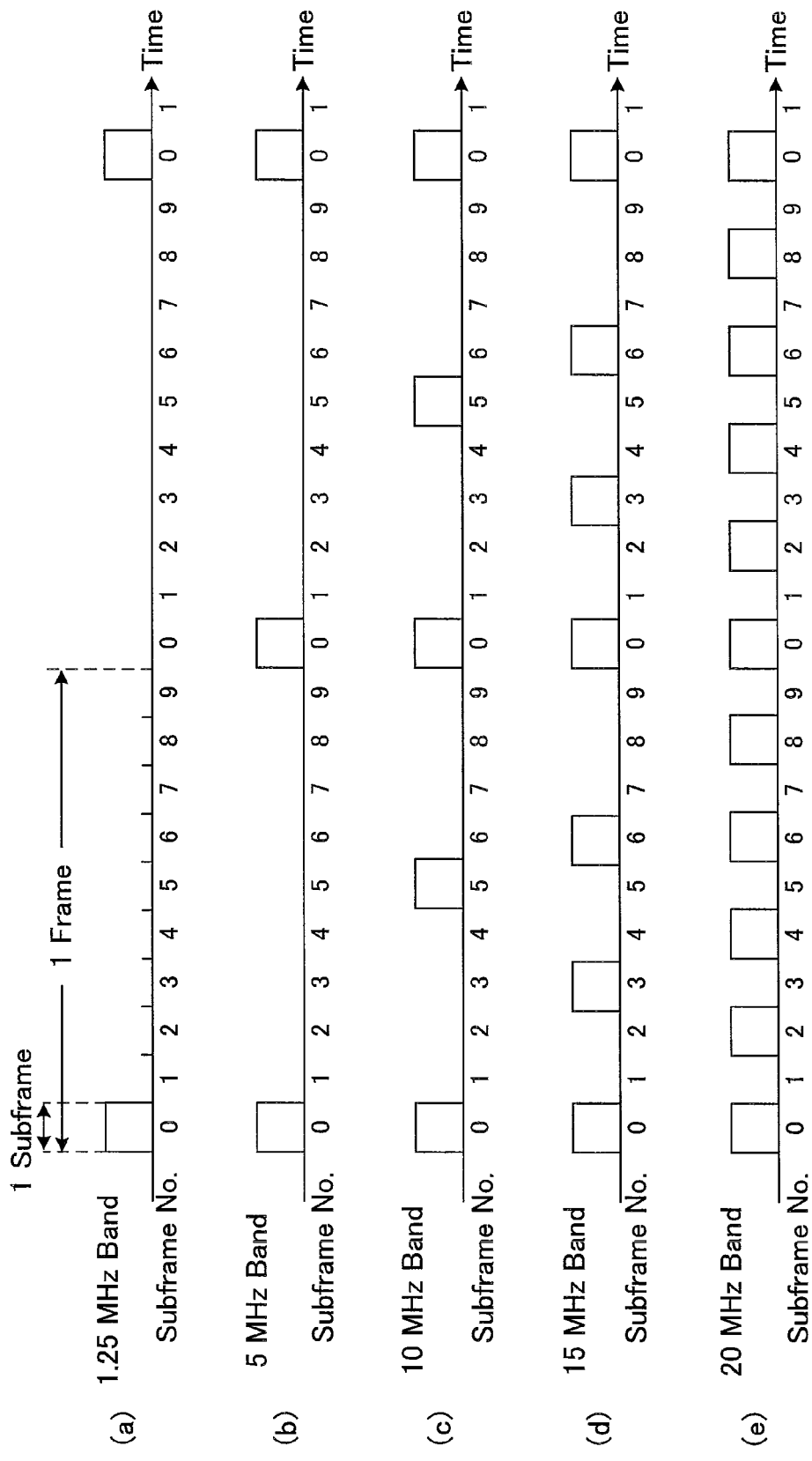
FIG. 16 is a diagram for illustrating random access channels in the background technology.
Figure 17:
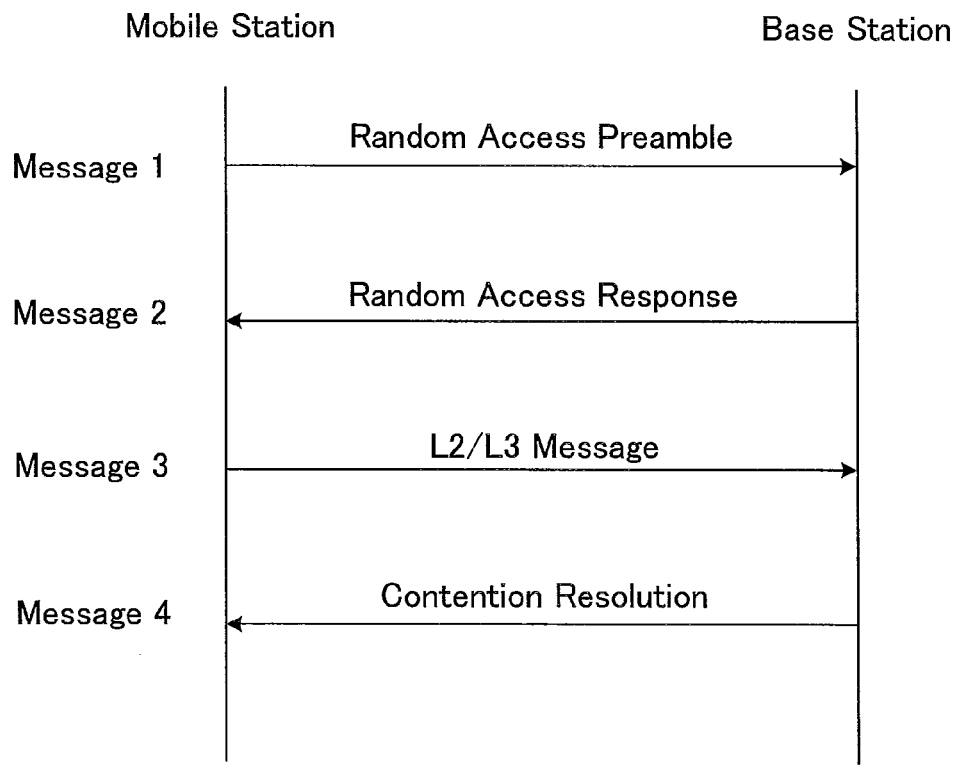
FIG. 17 is a diagram for illustrating the communication procedures between a mobile station apparatus and a base station apparatus in the background technology.
Figure 18:
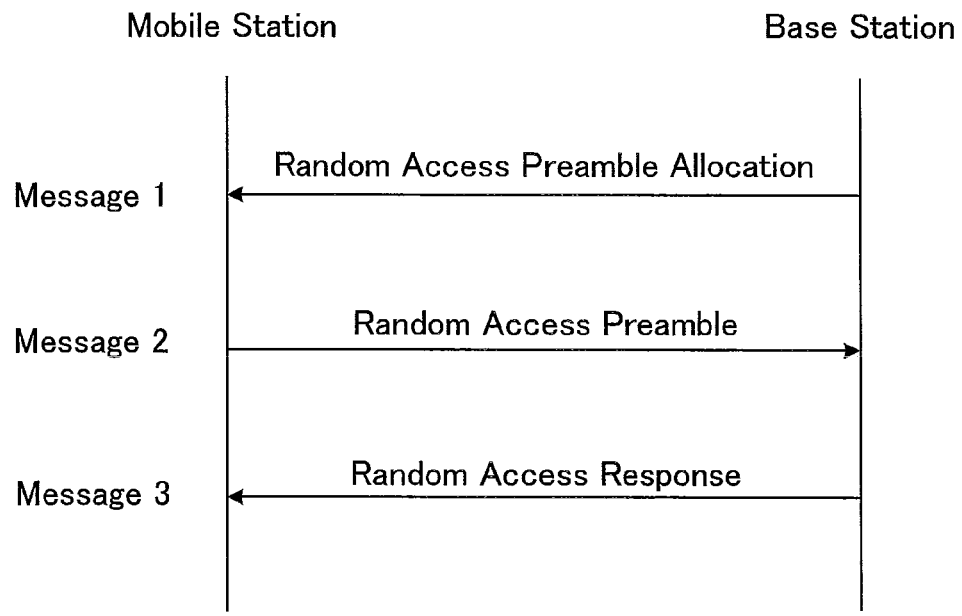
FIG. 18 is a diagram for illustrating the communication procedures between a mobile station apparatus and a base station apparatus in the background technology.
Figure 19:
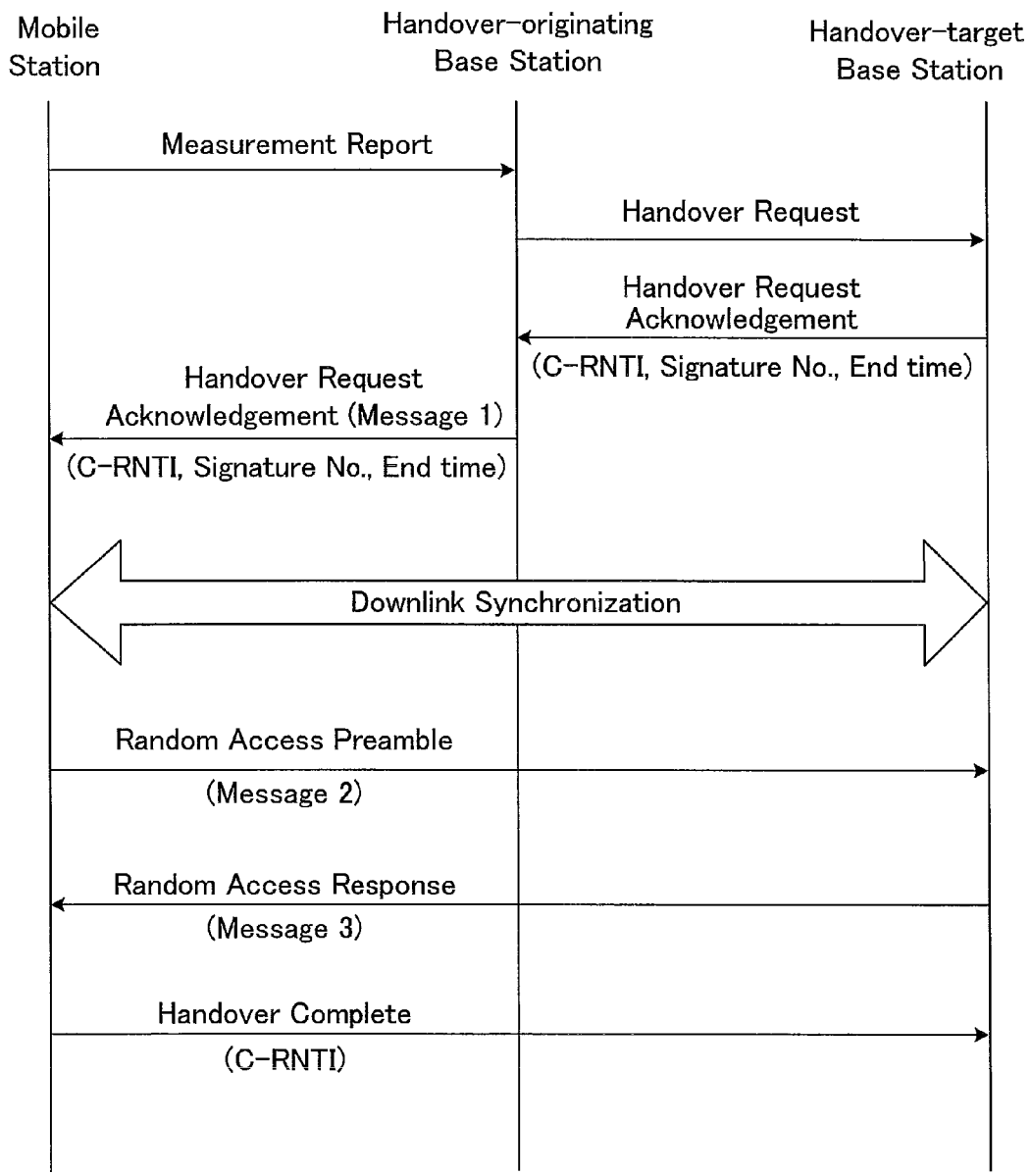
FIG. 19 is a diagram for illustrating the communication procedures between a mobile station apparatus and a base station apparatus in the background technology.
Figure 20:
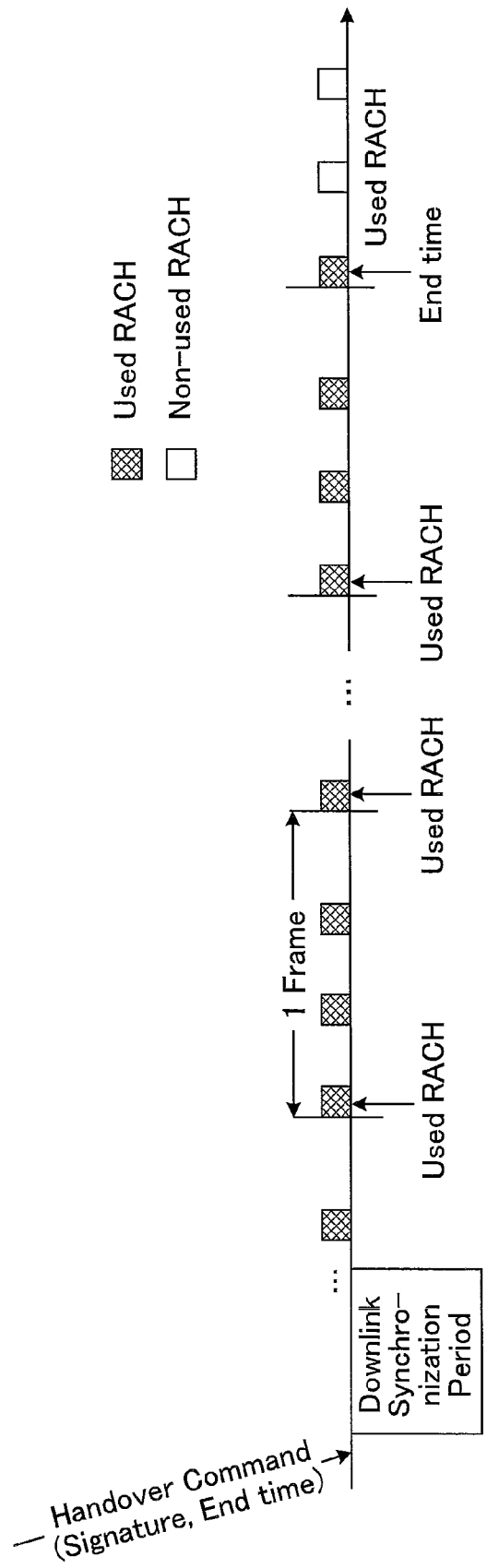
FIG. 20 is a diagram for illustrating the operation in the background technology.

Next, the operations of the mobile station apparatus and the base station apparatus will be described. FIG. 13 is a diagram showing the RACH conditions in the second embodiment. In this case, it is assumed that there are two random access channels (RACH) (one every 5 ms) in one frame (10 ms) and the signature transmission interval is set as one frame (9 ms).

Figure 11:
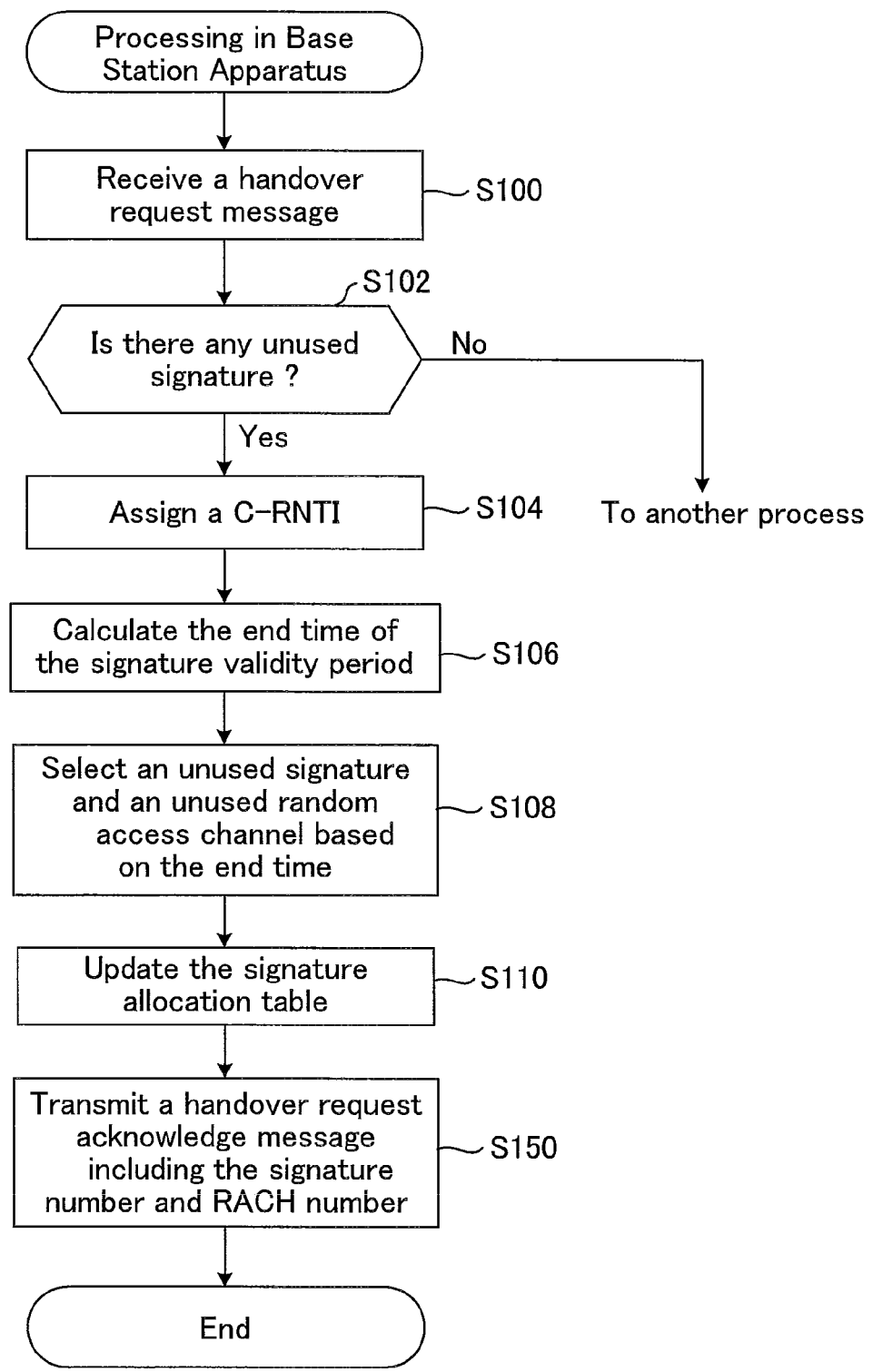
FIG. 11 is an operational flow for illustrating the process of a base station apparatus in a second embodiment.

First, base station apparatus 1 transmits a handover command (handover request acknowledgement message) included with the signature number and the random access channel (RACH) number to be used, to mobile station apparatus 5 (Step S150 in FIG. 11).

Mobile station apparatus 5 uses the random access channels (RACH) designated by the notified random access (RACH) number to be used, at intervals of one frame.

In this case, the random access channels (RACH) can be used at intervals of 10 ms. For one signature, the random access channels (RACH) at 0-subframe in each frame and at 5-subframe in each frame can be assigned to different mobile station apparatuses. Accordingly, the usage efficiency of a signature can be doubled in the case of FIG. 13.

A RA-RNTI (Random Access-Radio Network Temporary Identity) indicating a random access response is destined to correspond to the random access channel of each random access channel number. Accordingly, instead of notifying the random access channel number, the RA-RNTI may be notified. In this case, when acquiring the RA-RNTI notified from the base station apparatus, the mobile station apparatus transmits a random access preamble that designates the random access channel corresponding to the RA-RNTI as a random access channel usable for transmission, and waits for a random access response by monitoring the notified RA-RNTI. After detecting a failure of random access, the mobile station apparatus transmits once again by the random access channel that is destined to make reply by the aforementioned RA-RNTI.

In this way, by setting up the random access channel (RACH) to be used, it is possible to assign a signature to a plurality of mobile station apparatuses, it is hence possible to improve usage efficiency of a signature for random access under the initiative of the base station apparatus.

The invention claimed is:

1. A mobile communications system for performing communication using Non-contention based Random Access, in which different random access channel numbers are assigned respectively to a plurality of random access channels in one frame and a configuration of the random access channel numbers is the same in each frame,
   wherein
   a base station apparatus, by notifying a mobile station apparatus of a signature number of a signature for the Non-contention based Random Access and one of the random access channel numbers, assigns a signature corresponding to the signature number and a random access channel corresponding to the random access channel number in each frame, covering a plurality of sequential frames,
   the mobile station apparatus transmits a random access preamble including the signature corresponding to the notified signature number, using the random access channel corresponding to the notified random access channel number in a first frame, and
   when no response to the random access preamble is detected, the mobile station apparatus transmits the random access preamble including the signature corresponding to the notified signature number once again, using the random access channel corresponding to the notified random access channel number in a second frame.

2. A base station apparatus in a mobile communications system for performing communication using Non-contention based Random Access, in the mobile communications system, different random access channel numbers are assigned respectively to a plurality of random access channels in one frame and a configuration of the random access channel numbers is the same in each frame, wherein
   the base station apparatus, by notifying a mobile station apparatus of a signature number of a signature for the Non-contention based Random Access and one of the random access channel numbers, assigns a signature corresponding to the signature number and a random access channel corresponding to the random access channel number in each frame, covering a plurality of sequential frames.

3. A mobile station apparatus in a mobile communications system for performing communication using Non-contention based Random Access, in the mobile communications system, different random access channel numbers are assigned respectively to a plurality of random access channels in one frame and a configuration of the random access channel numbers is the same in each frame, wherein
   the mobile station apparatus acquires a signature number of a signature for the Non-contention based Random Access and one of the random access channel numbers from a base station apparatus,
   the mobile station apparatus transmits a random access preamble including the signature corresponding to the acquired signature number, using the random access channel corresponding to the acquired random access channel number in a first frame, and when no response to the random access preamble is detected, the mobile station apparatus transmits the random access preamble including the signature corresponding to the acquired signature number once again, using the random access channel corresponding to the acquired random access channel number in a second frame.

4. A mobile communications method for a mobile station apparatus in a mobile communications system for performing communication using Non-contention based Random Access, in the mobile communications system, different random access channel numbers are assigned respectively to a plurality of random access channels in one frame and a configuration of the random access channel numbers is the same in each frame, the mobile communications method comprising:

acquiring a signature number of a signature for the Non-contention based Random Access and one of the random access channel numbers, from a base station apparatus;

transmitting a random access preamble including the signature corresponding to the acquired signature number, using a random access channel corresponding to the acquired random access channel number in a first frame; and transmitting, based on the occurrence that no response to the random access preamble is detected, once again the random access preamble including the signature corresponding to the acquired signature number, using the random access channel corresponding to the acquired random access channel number in a second frame.

5. A mobile communications method for a base station apparatus in a mobile communications system for performing communication using Non-contention based Random Access, in the mobile communications system, different random access channel numbers are assigned respectively to a plurality of random access channels in one frame and a configuration of the random access channel numbers is the same in each frame, the mobile communications method comprising:

by notifying a mobile station apparatus of a signature number of a signature for the Non-contention based Random Access and one of the random access channel numbers, assigning a signature corresponding to the signature number and a random access channel corresponding to the random access channel number, covering a plurality of sequential frames.

6. A mobile communications system, the mobile communications system comprising:

a base station apparatus; and a mobile station apparatus, wherein the base station apparatus, by notifying a mobile station apparatus of a signature number of a signature for Non-contention based Random Access and one of a plurality of random access channel numbers, assigns a signature corresponding to the signature number and a random access channel corresponding to the random access channel number, covering a plurality of sequential frames, the mobile station apparatus transmits a random access preamble including the signature corresponding to the notified signature number, using the random access channel corresponding to the notified random access channel number in a first frame, and based on the occurrence that no response to the random access preamble is detected, the mobile station apparatus transmits the random access preamble including the signature corresponding to the notified signature number once again, using the random access channel corresponding to the notified random access channel number in a second frame.

7. A base station apparatus in a mobile communications system for performing communication using Non-contention based Random Access, in the mobile communications system, different random access channel numbers are assigned respectively to a plurality of random access channels in one frame and a configuration of the random access channel numbers is the same in each frame, the base station apparatus comprising:

an assigning unit, of the base station apparatus, which assigns a signature corresponding to a signature number and a random access channel corresponding to one of the random access channel numbers, covering a plurality of sequential frames; and a notification unit, of the base station apparatus, which notifies a mobile station apparatus of the signature number of the signature for the Non-contention based Random Access and the random access channel number.

8. A mobile station apparatus in a mobile communications system for performing communication using Non-contention based Random Access, in the mobile communications system, different random access channel numbers are assigned respectively to a plurality of random access channels in one frame and a configuration of the random access channel numbers is the same in each frame, the mobile station apparatus comprising:

an acquiring unit, of the mobile station apparatus, which acquires a signature number of a signature for the Non-contention based Random Access and one of the random access channel numbers from a base station apparatus; and a transmitting unit, of the mobile station apparatus, which transmits a random access preamble including the signature corresponding to the acquired signature number, using the random access channel corresponding to the acquired random access channel number in a first frame, wherein based on the occurrence that no response to the random access preamble is detected, the transmitting unit, of the mobile station apparatus, transmits the random access preamble including the signature corresponding to the acquired signature number once again, using the random access channel corresponding to the acquired random access channel number in a second frame.

* * * * *